(12) United States Patent
Ibrahim et al.

(10) Patent No.: US 12,375,145 B2
(45) Date of Patent: Jul. 29, 2025

(54) L2 CLI MEASUREMENT AND REPORTING

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Huilin Xu, Temecula, CA (US); Ahmed Attia Abotabl, San Diego, CA (US); Thomas Valerrian Pasca Santhappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 17/818,958

(22) Filed: Aug. 10, 2022

(65) Prior Publication Data

US 2024/0056148 A1    Feb. 15, 2024

(51) Int. Cl.
*H04W 24/10*      (2009.01)
*H04B 7/06*       (2006.01)
(Continued)

(52) U.S. Cl.
CPC ......... *H04B 7/0626* (2013.01); *H04L 5/0098* (2013.01); *H04W 24/10* (2013.01); *H04W 72/0446* (2013.01)

(58) Field of Classification Search
None
See application file for complete search history.

(56) References Cited

U.S. PATENT DOCUMENTS

2020/0351690 A1* 11/2020 Zhu .................. H04B 17/24
2021/0144574 A1*  5/2021 Jin .................. H04L 5/0048
(Continued)

FOREIGN PATENT DOCUMENTS

WO    2022055816 A1    3/2022

OTHER PUBLICATIONS

3GPP TS 38.214 V17.2.0: "3rd Generation Partnership Project, Technical Specification Group Radio Access Network, NR, Physical Layer Procedures for Data (Release 17)", 3rd Generation Partnership Project, Mobile Competence Centre, 650, Route Des Lucioles, F-06921 Sophia-Antipolis Cedex, France, vol. RAN WG1, No. V17.2.0, Jun. 23, 2022, pp. 1-229, paragraph [5.2.1.5.2].

(Continued)

*Primary Examiner* — Duc T Duong
(74) *Attorney, Agent, or Firm* — Paul M. McAdams; Procopio, Cory, Hargreaves & Savitch LLP

(57) ABSTRACT

Apparatus, methods, and computer program products for cross-link interference (CLI) measurements are provided. An example method may include receiving, from a second network entity, a configuration of a set of semi-persistent (SP) or periodic (P) (SP/P) CLI measurement resources for layer 2 (L2) CLI measurement, where the set of SP/P CLI measurement resources are associated with one or more measurement resource types including at least one of: a zero power sounding reference signal (ZP SRS), a channel state information (CSI) interference measurement (CSI IM) resource, a non-zero power (NZP) CSI reference signal (CSI RS), or a combination of the NZP CSI RS and CSI IM, where the one or more measurement resource types are tied to at least one respective CLI reporting metric or not tied to the respective CLI reporting metric.

31 Claims, 17 Drawing Sheets

(51) Int. Cl.
  *H04L 5/00*      (2006.01)
  *H04W 72/0446*   (2023.01)
  *H04W 72/11*     (2023.01)
  *H04W 72/23*     (2023.01)

(56) References Cited

U.S. PATENT DOCUMENTS

| | | | | |
|---|---|---|---|---|
| 2021/0328692 | A1* | 10/2021 | Zhang | H04B 7/088 |
| 2022/0015114 | A1* | 1/2022 | Xu | H04L 5/0073 |
| 2022/0116129 | A1* | 4/2022 | Ying | H04B 7/0617 |
| 2022/0386156 | A1* | 12/2022 | Park | H04W 24/10 |
| 2023/0055304 | A1* | 2/2023 | Shim | H04W 72/542 |
| 2023/0164701 | A1* | 5/2023 | Fakoorian | H04L 5/0053 |
| | | | | 455/522 |
| 2023/0189382 | A1* | 6/2023 | Haustein | H04W 76/20 |
| | | | | 370/329 |
| 2023/0319605 | A1* | 10/2023 | Park | H04L 5/00 |
| | | | | 370/252 |
| 2023/0328560 | A1* | 10/2023 | Ibrahim | H04W 24/08 |
| | | | | 370/252 |
| 2024/0015546 | A1* | 1/2024 | Awadin | H04W 24/10 |
| 2024/0114489 | A1* | 4/2024 | Liu | H04W 72/044 |

OTHER PUBLICATIONS

3GPP TS 38.321 V17.1.0: "3rd Generation Partnership Project, Technical Specification Group Radio Access Network, NR, Medium Access Control (MAC) protocol specification (Release 17)", 3rd Generation Partnership Project, Mobile Competence Centre, 650, Route Des Lucioles, F-06921 Sophia-Antipolis Cedex, France, vol. RAN WG2, No. V17.1.0 20, Jul. 20, 2022, pp. 1-241, paragraph [6.1.3].

3GPP TS 38.331 V17.1.0: "3rd Generation Partnership Project, Technical Specification Group Radio Access Network, NR, Radio Resource Control (RRC) protocol specification (Release 17)", 3rd Generation Partnership Project, Mobile Competence Centre, 650, Route Des Lucioles, F-06921 Sophia-Antipolis Cedex, France, vol. RAN WG2, No. V17.1.0, Jul. 19, 2022, pp. 1-1273, paragraph [5.5.3].

International Search Report and Written Opinion—PCT/US2023/026986—ISA/EPO—Oct. 27, 2023.

* cited by examiner

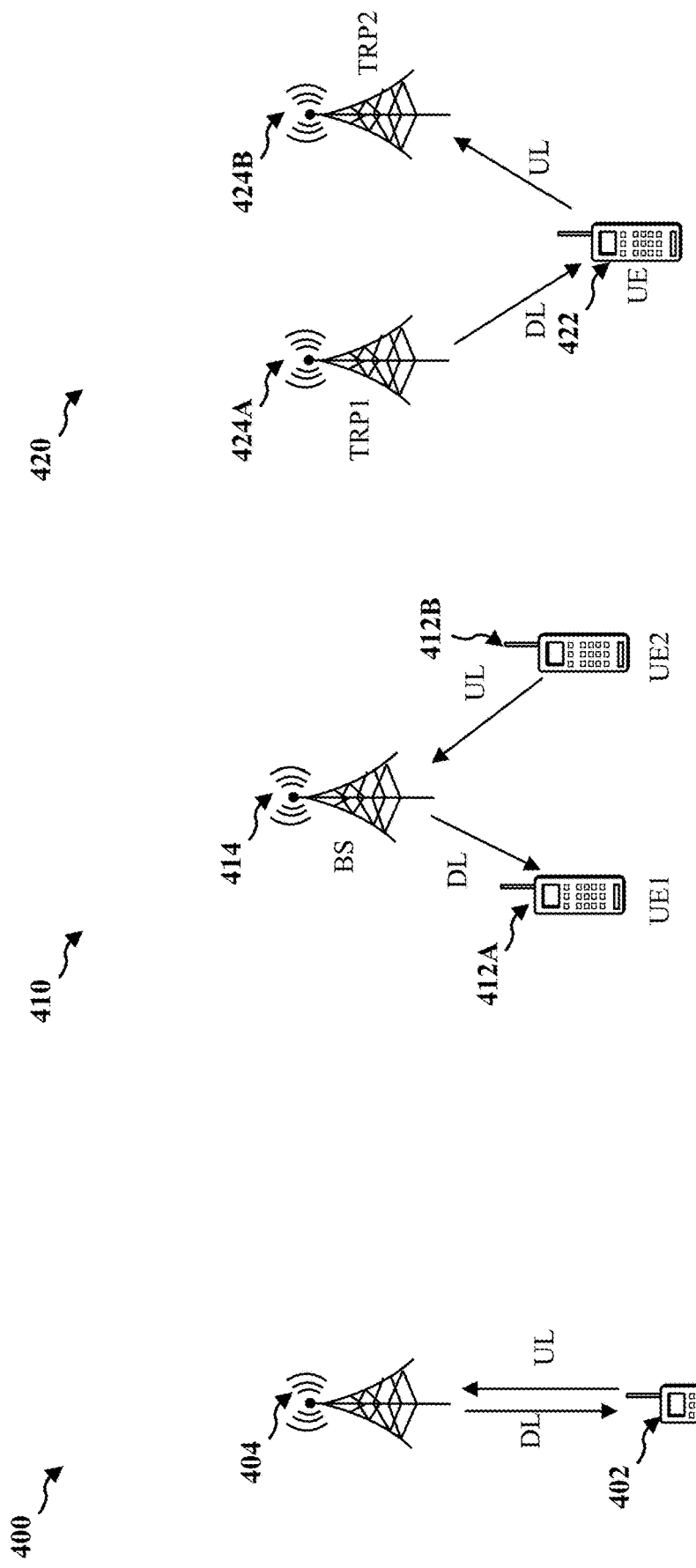

L2 CLI MEASUREMENT AND REPORTING

TECHNICAL FIELD

The present disclosure relates generally to communication systems, and more particularly, to wireless communication systems with cross-link interference (CLI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive, from a second network entity, a configuration of a set of semi-persistent (SP) or periodic (P) (SP/P) cross-link interference (CLI) measurement resources for layer 2 (L2) CLI measurement, where the set of SP/P CLI measurement resources are associated with one or more measurement resource types including at least one of: a zero power sounding reference signal (ZP SRS), a channel state information (CSI) interference measurement (CSI IM) resource, a non-zero power (NZP) CSI reference signal (CSI RS), or a combination of the NZP CSI RS and CSI IM, where the one or more measurement resource types are tied to at least one respective CLI reporting metric or not tied to the respective CLI reporting metric. The memory and the at least one processor coupled to the memory may be further configured to receive, from the second network entity, a first activation associated with the set of SP/P CLI measurement resources. The memory and the at least one processor coupled to the memory may be further configured to generate CLI measurement information based on the set of SP/P CLI measurement resources and the first activation. The memory and the at least one processor coupled to the memory may be further configured to transmit, to the second network entity, the CLI measurement information.

In another aspect of the disclosure, a method, a computer-readable medium, and an apparatus at a network entity are provided. The apparatus may include a memory and at least one processor coupled to the memory. The memory and the at least one processor coupled to the memory may be configured to transmit, for a second network entity, a configuration of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. The memory and the at least one processor coupled to the memory may be further configured to transmit, for the second network entity, a first activation associated with the set of SP/P CLI measurement resources. The memory and the at least one processor coupled to the memory may be further configured to receive CLI measurement information based on the set of SP/P CLI measurement resources and the first activation.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4A is a diagram illustrating example full duplex operations.

FIG. 4B is a diagram illustrating example full duplex operations.

FIG. 4C is a diagram illustrating example full duplex operations.

DETAILED DESCRIPTION

Figure 1:
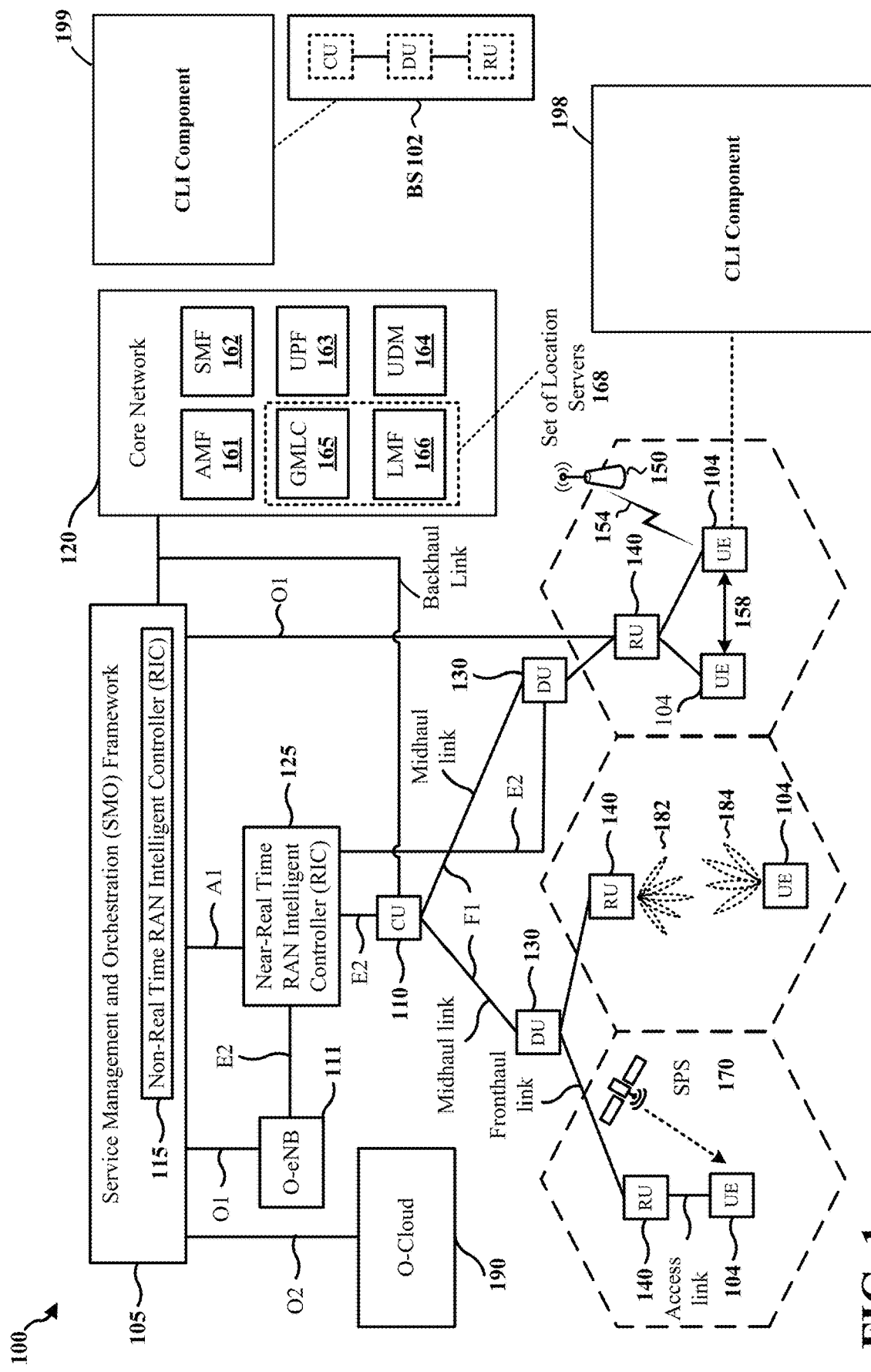
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a CLI component 198. In some aspects, the CLI component 198 may be configured to receive, from a second network entity, a configuration of a set of semi-persistent (SP) or periodic (P) (SP/P) cross-link interference (CLI) measurement resources for layer 2 (L2) CLI measurement, where the set of SP/P CLI measurement resources are associated with one or more measurement resource types including at least one of: a zero power sounding reference signal (ZP SRS), a channel state information (CSI) interference measurement (CSI IM) resource, a non-zero power (NZP) CSI reference signal (CSI RS), or a combination of the NZP CSI RS and CSI IM, where the one or more measurement resource types are tied to at least one respective CLI reporting metric or not tied to the respective CLI reporting metric. In some aspects, the CLI component 198 may be further configured to receive, from the second network entity, a first activation associated with the set of SP/P CLI measurement resources. In some aspects, the CLI component 198 may be further configured to generate CLI measurement information based on the set of SP/P CLI measurement resources and the first activation. In some aspects, the CLI component 198 may be further configured to transmit, to the second network entity, the CLI measurement information.

In certain aspects, the base station 102 may include a CLI component 199. In some aspects, the CLI component 199 may be configured to transmit, for a second network entity, a configuration of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. In some aspects, the CLI component 199 may be further configured to transmit, for the second network entity, a first activation associated with the set of SP/P CLI measurement resources. In some aspects, the CLI component 199 may be further configured to receive CLI measurement information based on the set of SP/P CLI measurement resources and the first activation.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figures 2A, 2B, 2C, 2D:
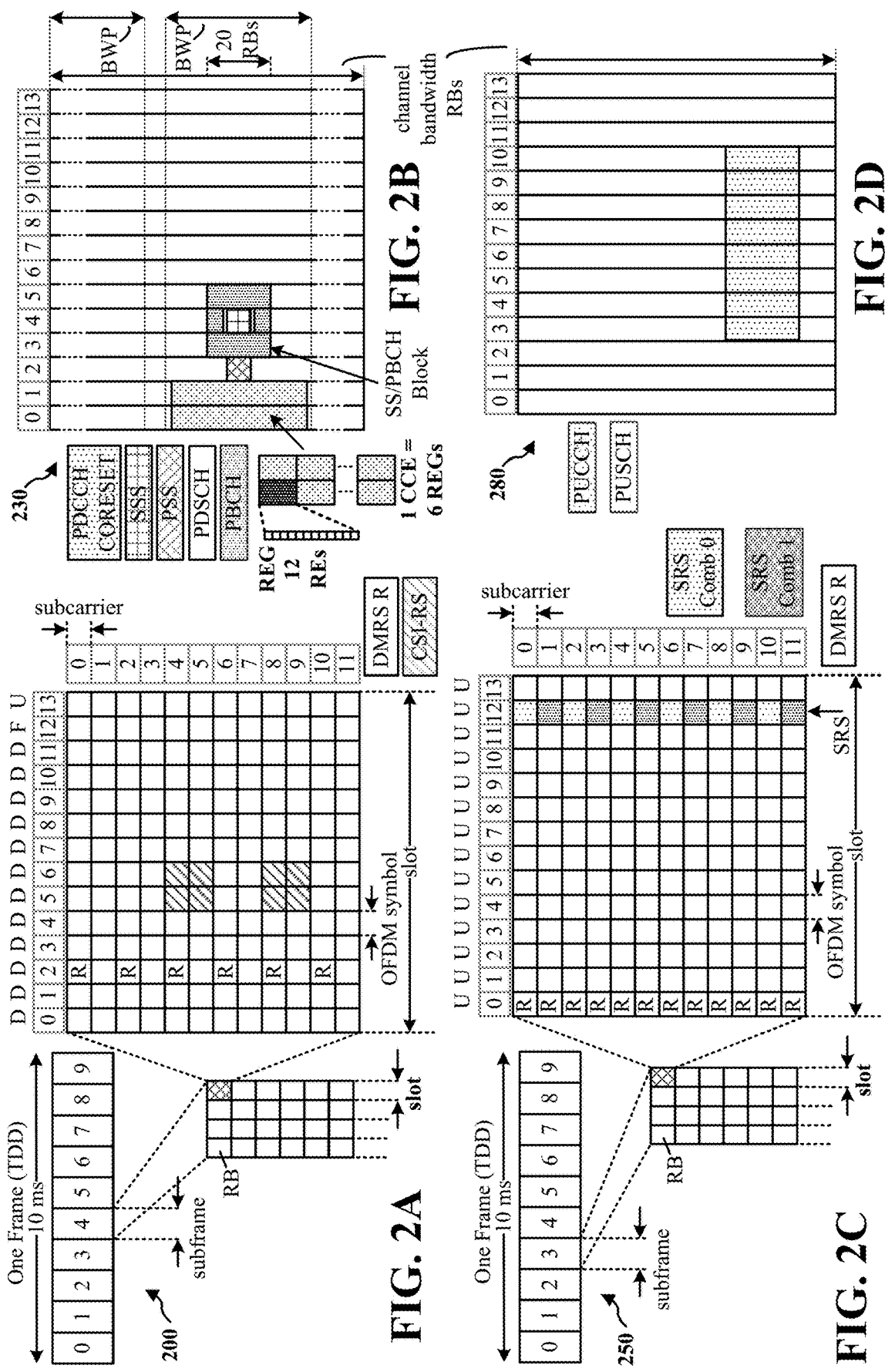
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

Numerology, SCS, and CP

| μ | SCS Δf = $2^μ$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^μ$ slots/subframe. The subcarrier spacing may be equal to 2*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
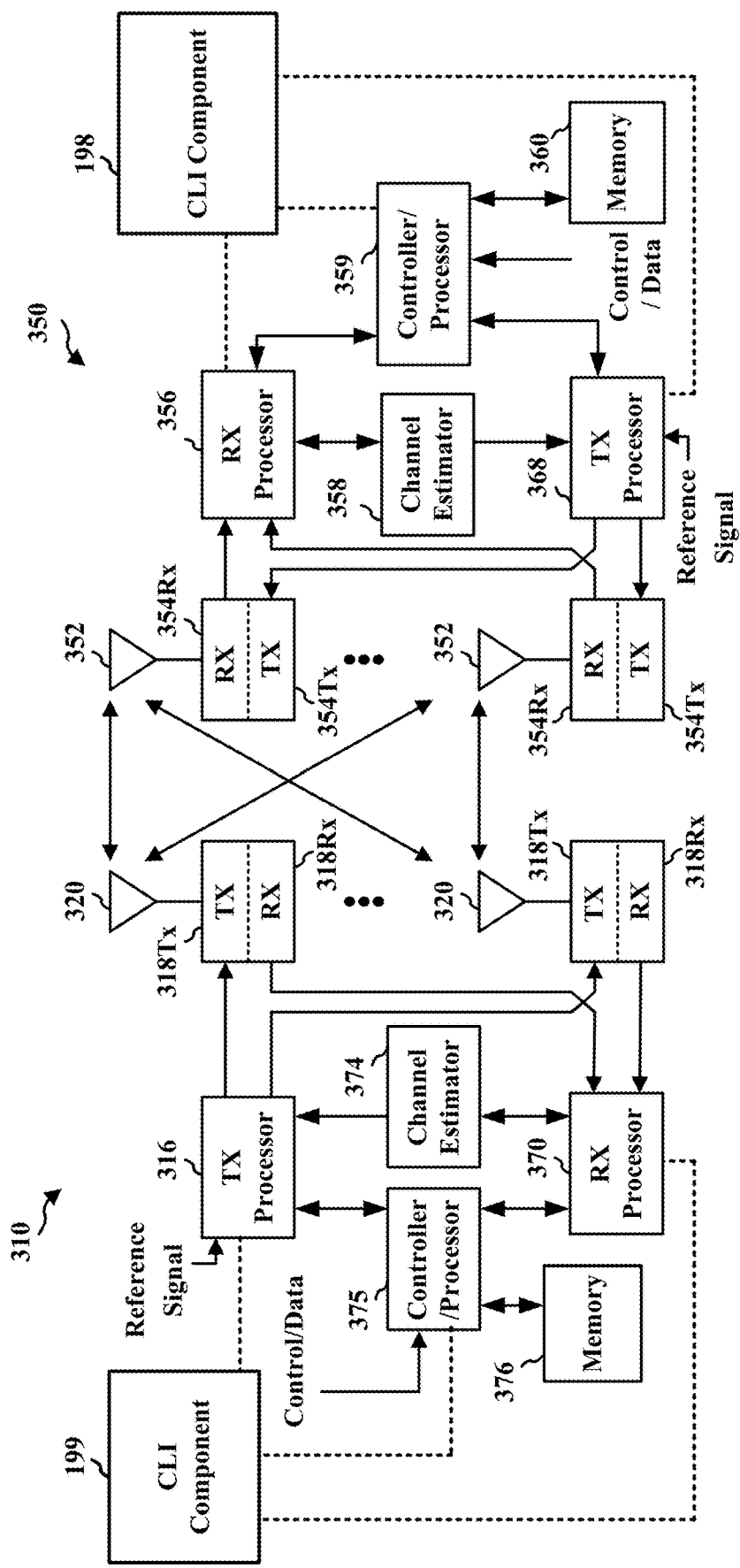
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with CLI component 198 of FIG. 1.

At least one of the TX processor 316, the RX processor 370, and the controller/processor 375 may be configured to perform aspects in connection with CLI component 199 of FIG. 1.

As used herein, the term "SP/P" refers to semi-persistent or periodic. As used herein, the term "tied to" may be used to refer to scenarios where a CLI measurement resource is configured to be used for measurements based on a first set of one or more CLI reporting metrics and not used for measurements based on a second set of one or more one or more CLI reporting metrics. The CLI measurement resource may be referred to as "tied to" the first set of one or more CLI reporting metrics. In some aspects, the measurement resources may be SRS for CLI measurement (e.g., zero-power (ZP) SRS), CSI-IM, NZP CSI-RS, or a combination of NZP CSI-RS and CSI-IM. In some aspects, the CLI reporting metric may be a reference signal received power (RSRP), a received signal strength indicator (RSSI), or a signal to interference and noise ratio (SINR). As used herein, the term "activation" may refer to an activation for activating CLI measurement resources, an activation for transmission of CLI measurement information, or a joint activation for activating CLI measurement resources and transmission of CLI measurement information. As used herein, the term "deactivation" may refer to a deactivation for deactivating CLI measurement resources, a deactivation for transmission of CLI measurement information, or a joint deactivation for deactivating CLI measurement resources and transmission of CLI measurement information. In some aspects, a UE may decode an activation or deactivation and may make one or more changes based on the activation or deactivation according to timing configuration(s). The process in which the UE decode an activation and make one or more changes based on the activation or deactivation may be referred to as "an application of" the activation or the deactivation. The term "timing configuration" may refer to a configuration representing timing of UE behavior (e.g., timing associated with decode the activation and make one or more changes based on the activation or the deactivation) that may be configured at the UE without network signaling. A timing configuration may represent an application of the activation or the deactivation after some amount of time, such as after one of: a first quantity of slots independent of a capability associated with the UE or a second quantity of slots based on the capability. As used herein, the term "CLI measurement information" may refer to one or more CLI reports that may each include CLI measurements generated based on one (or at least one) CLI reporting metric (such as RSRP, RSSI, SINR, or the like). As used herein, the term "layer 2" or "L2" may refer to the MAC layer and the logical link control (LLC) layer. As used herein, the term "CLI measurement resources" may refer to resources for CLI measurements.

In some wireless communication systems, full duplex (FD) capability (supporting simultaneous UL or DL transmission) may be present at a base station, a UE, or both the base station and the UE. For example, at the UE, UL transmissions may be transmitted from a first panel of the UE while simultaneous DL receptions may be received at a second panel of the UE. The first panel and the second panel may be different panels of the antenna(s) on the UE. As another example, at the base station, UL receptions may be received from a first panel of the base station while simultaneous DL transmissions may be transmitted at a second panel of the base station. The first panel and the second panel may be different panels of the antenna(s) on the base station. By supporting FD, latency of communications may be potentially reduced. For example, it may be possible for a UE to receive DL signal in slots assigned for UL, which may enable latency savings. Furthermore, by supporting FD, spectrum efficiency per cell and per UE may be improved because resource utilization over the spectrum may be more efficient.

Subband (SB) non-overlapping full duplex and dynamic/flexible time division duplex (TDD) may be used in wireless communication systems to enhance spectrum efficiency and enhance throughput by dynamically altering UL or DL transmission direction. However, inter-network entity and inter-UE CLI, which may be intra-subband CLI or inter-subband CLI may occur. A victim UE or a victim network entity may receive transmissions not targeted to the victim from an aggressor UE or an aggressor network entity. For example, CLI may occur when a UL/DL symbol from the aggressor collides with a UL/DL symbol of the victim. Aspects provided herein may facilitate addressing CLI, improving overall efficiency in the communication system.

FIG. 4A is a diagram 400 illustrating example full duplex operations. As illustrated in FIG. 4A, an FD TRP 404 of a network entity may be transmitting DL communications to an FD UE 402 while receiving UL communications from the FD UE 402. The FD UE 402 may be transmitting UL communications to the FD TRP 404 while receiving DL communications from the FD TRP 404.

FIG. 4B is a diagram 410 illustrating example full duplex operations. As illustrated in FIG. 4B, an FD TRP 414 of a network entity may be transmitting DL communications to a first UE 412A while receiving UL communications from a second UE 412B. In some aspects, the first UE 412A and the second UE 412B may be half-duplex (HD) and may not support FD operations. In some aspects, the first UE 412A and the second UE 412B may support FD operations and may be operating in a HD mode.

FIG. 4C is a diagram 420 illustrating example full duplex operations. As illustrated in FIG. 4C, an FD UE 422 may be simultaneously connected to a first TRP 424A and a second TRP 424B. The FD UE 422 may be receiving DL communications from the first TRP 424A while transmitting UL communications to the second TRP 424B. In some aspects, the first TRP 424A and the second TRP 424B may be HD and may not support FD operations. In some aspects, the first TRP 424A and the second TRP 424B may support FD operations and may be operating in a HD mode.

Figures 5A, 5B, 5C:
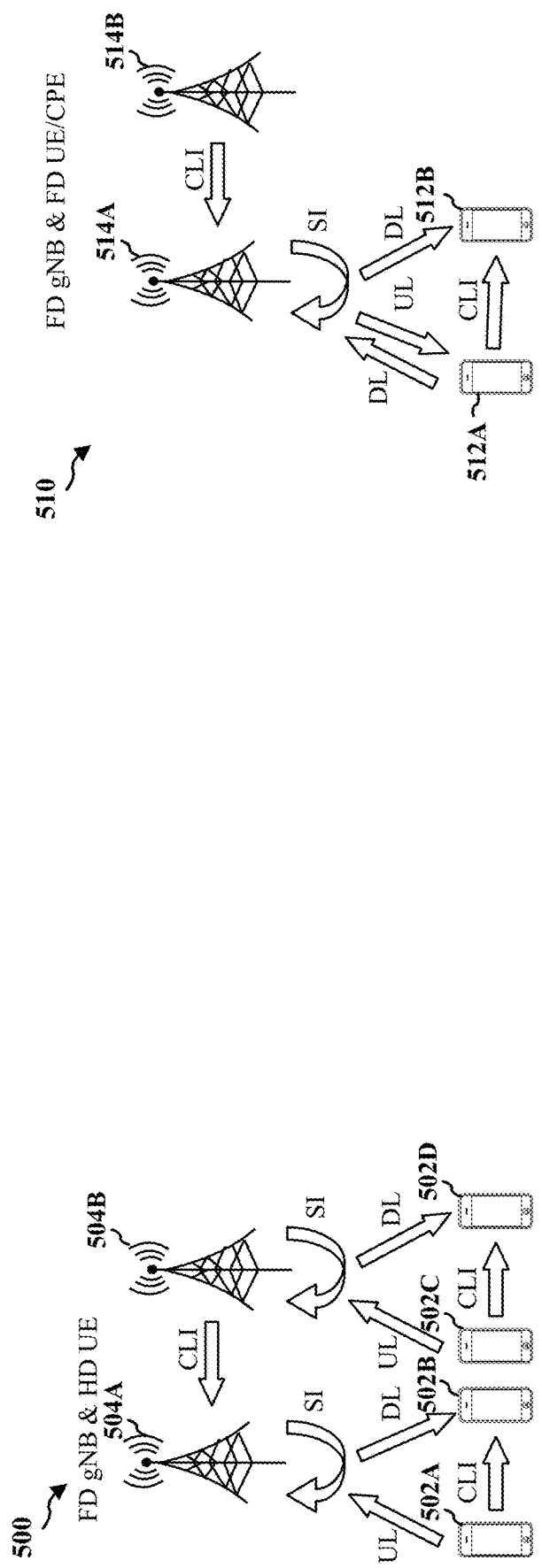
FIG. 5A is a diagram illustrating example communication between full duplex network entity and half duplex UE.
FIG. 5B is a diagram illustrating example communication between full duplex network entity and full duplex UE.
FIG. 5C is a diagram illustrating example communication between half duplex network entity and full duplex UE.

FIG. 5A is a diagram 500 illustrating example communication between a full duplex network entity and a half duplex UE. As illustrated in diagram 500 in FIG. 5A, two TRPs, TRP 504A and TRP 504B operating in full-duplex mode and four UEs, UE 502A, UE 502B, UE 502C, and UE 502D operating in half-duplex mode are shown in the depicted example. While the TRP 504A may be simultaneously transmitting downlink data to the UE 502B and receiving uplink data from the UE 502A, self-inference between the uplink reception and the downlink transmission at the TRP 504A may occur. For example, a receiver at the TRP may receive the transmitted downlink signal as interference to the uplink signal. Similarly, self-interference between the uplink reception and the downlink transmission at the TRP 504B may occur. In some aspects, because the UE 502B may be receiving downlink data and the UE 502A may be simultaneously transmitting uplink data, the transmission from the UE 502A may cause cross-link interference (CLI) to the downlink signal being received by the UE 502B. Similarly, the transmission from the UE 502C may cause CLI to the downlink signal being received by the UE 502D. Moreover, because the TRP 504B may also be receiving uplink data from the UE 502C and transmitting downlink data to the UE 502D, CLI between the TRP 504A and the TRP 504B may occur.

FIG. 5B is a diagram 510 illustrating example communication between full duplex network entity and full duplex UE. As illustrated in diagram 500 in FIG. 5A, two TRPs, TRP 514A and TRP 514B operating in full-duplex mode and two UEs, UE 512A and UE 512B operating in full duplex mode are included. The TRP 514A may be transmitting a downlink transmission to the UE 512A while simultaneously receiving an uplink transmission from the UE 512A. The TRP 514A may be also transmitting a downlink transmission to the UE 512B. Self-interference from uplink transmission to downlink reception at the UE 512A may occur. Self-interference from downlink transmission to uplink reception at the TRP 514A may also occur. If the TRP 514B is transmitting at the same time, CLI may also occur at the TRP 514A.

FIG. 5C is a diagram 520 illustrating example communication between half duplex network entity and full duplex UE. As illustrated in FIG. 5C, a TRP 524A and a TRP 524B may be operating in a HD mode and a UE 522A and a UE 522B may be operating in a FD mode. The UE 522A may be simultaneously transmitting an uplink transmission to the TRP 524A and receiving a downlink transmission from the TRP 524B. At the same time, the UE 522B may be receiving a downlink transmission from the TRP 524B. Self-interference from uplink transmission to downlink reception at the UE 522A may occur. CLI may also occur for the UE 522B because the UE 522B may receive the uplink transmission from the UE 522A while receiving the downlink transmission from the TRP 524B.

Figures 6A, 6B:
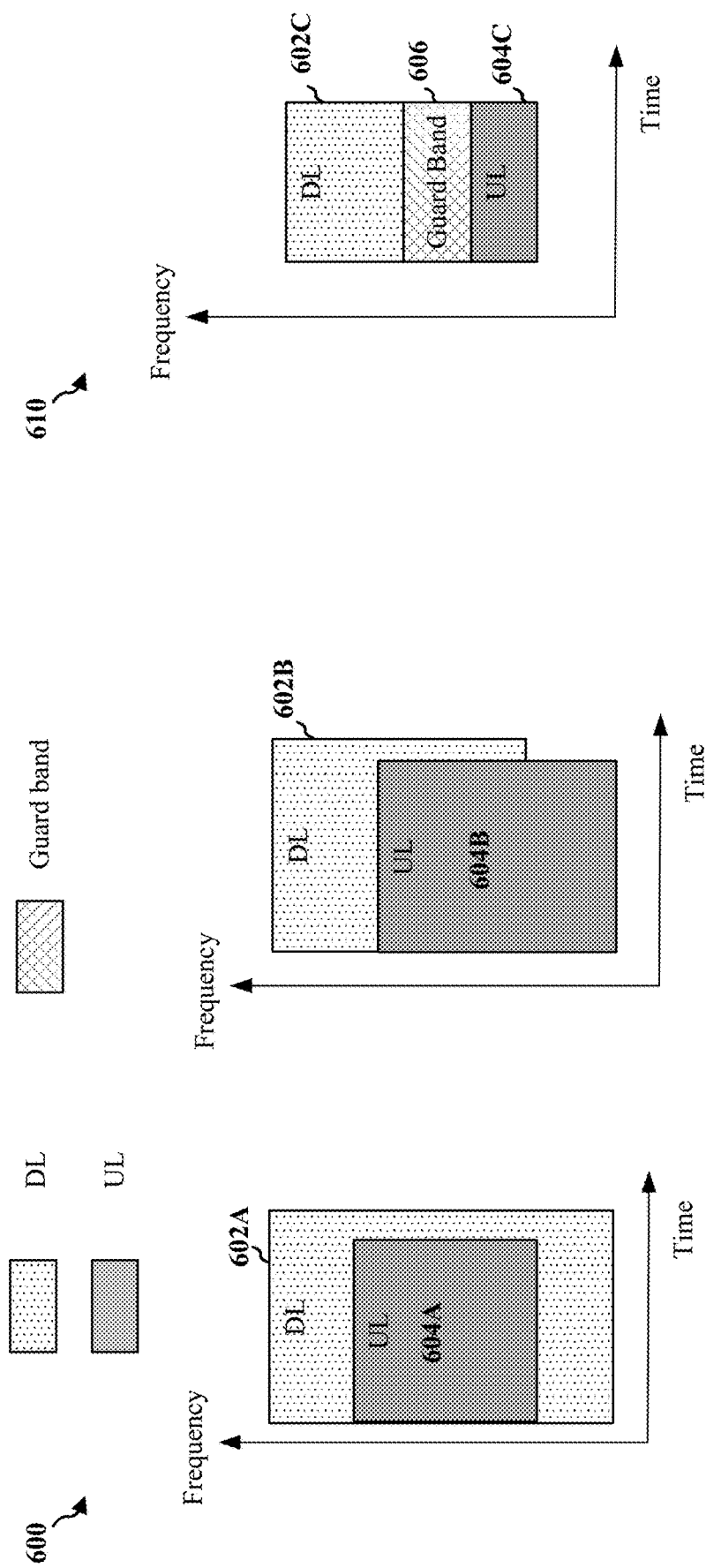
FIG. 6A is a diagram illustrating a first type of full-duplex communication.
FIG. 6B is a diagram illustrating a second type of full-duplex communication.

Full-duplex operation may be in the form of in-band full-duplex (IBFD) or sub-band frequency division duplexing (FDD) (otherwise known as "flexible duplex"). As illustrated in diagram 600 in FIG. 6A which illustrates a first type of full-duplex communication (IBFD), for IBFD, the transmission and reception may occur at the same time, e.g., overlapping in time, and on the same frequency resource, e.g., using overlapping frequency resources. As illustrated in FIG. 6A, the IBFD time/frequency resources for downlink 602A and IBFD time/frequency resources for uplink 604A may be fully overlapped in some examples. In other examples, IBFD time/frequency resources for downlink 602B and IBFD time/frequency resources for uplink 604B may be partially overlapped, as illustrated in FIG. 6A.

For sub-band FDD, as illustrated in diagram 610 in FIG. 6B which illustrates a second type of full-duplex communication (sub-band FDD), the transmission and reception may occur at the same time, e.g., at least partially overlapping in time, but on different frequency resources. The downlink resources 602C may be separated from the uplink resources 604C in frequency domain. The separation may be referred to as a guard band 606, for example, and may provide a frequency gap or frequency separation between the downlink resources 602C and the uplink resources 604C.

Figure 7:
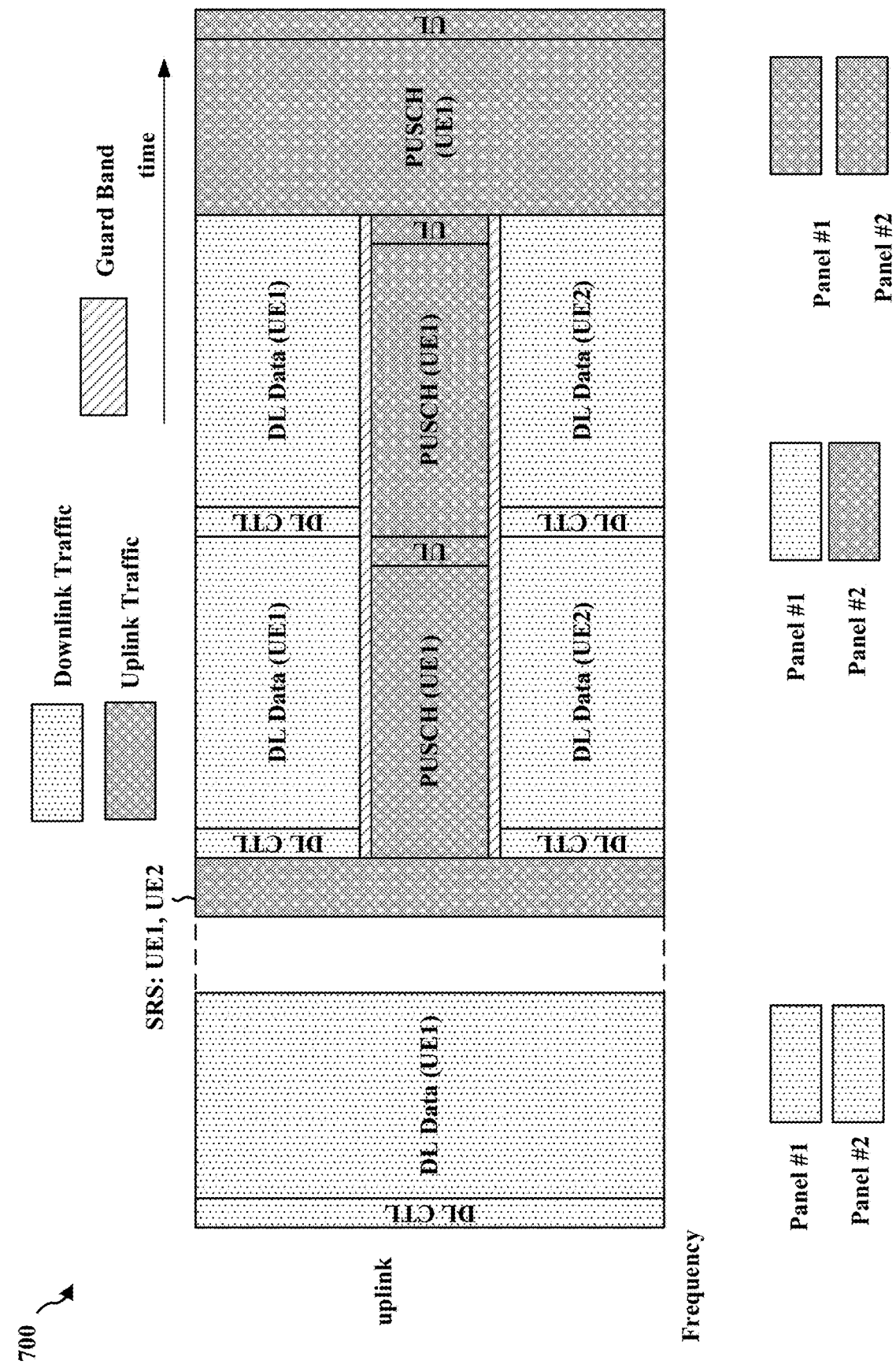
FIG. 7 is a diagram illustrating example slot format for full-duplex communication.

FIG. 7 is a diagram 700 illustrating example slot format for full-duplex communication. A slot format may include a "D+U" slot in which the band may be used for both UL and DL transmissions. The DL and UL transmissions may occur in overlapping bands (in-band full-duplex) or adjacent bands (sub-band full-duplex). In a "D+U" symbol, a HD UE may either transmit in the UL band or receive in the DL band. In a "D+U" symbol, the FD UE may transmit in the UL band and receive in the DL band in the same slot. A "D+U" slot may include DL symbols, UL symbols or full-duplex symbols.

Figure 8:
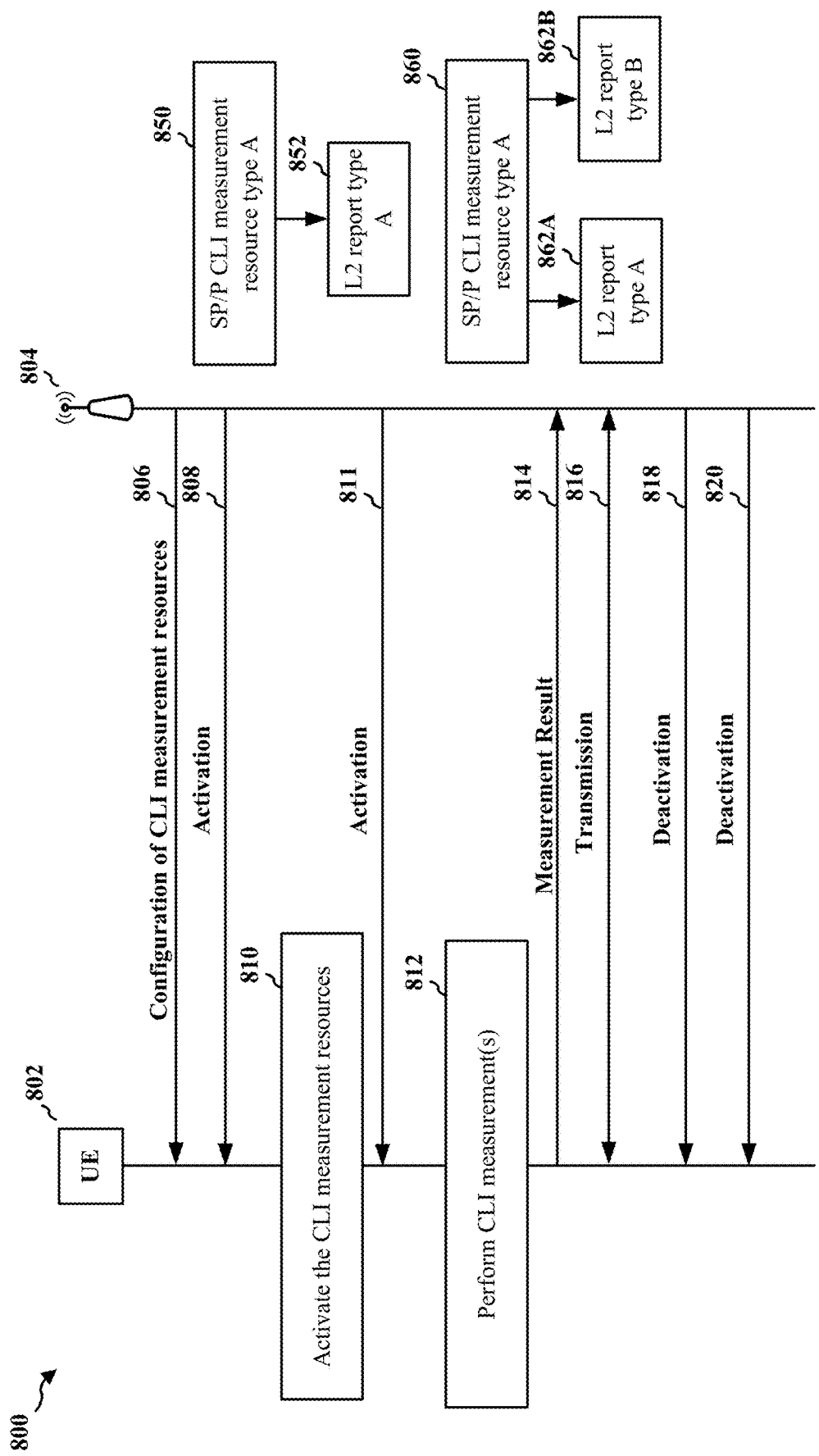
FIG. 8 is a diagram illustrating example communications between a network entity and a UE.

FIG. 8 is a diagram 800 illustrating example communications between a network entity 804 and a UE 802. In some aspects, the network entity 804 may be implemented as an aggregated base station, a disaggregated base station, an integrated access and backhaul (IAB) node, a relay node, a sidelink node, or the like. In some aspects, the network entity 804 may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. In some aspects, the UE 802 may be a victim UE. In some aspects, the UE 802 may be an aggressor UE.

As illustrated in FIG. 8, the UE 802 may receive a configuration of CLI measurement resources 806 from the network entity 804. In some aspects, the configuration of CLI measurement resources 806 may configure CLI measurement resources of different types, such as SRS for CLI measurement (e.g., zero-power (ZP) SRS), CSI-IM, NZP CSI-RS, or a combination of NZP CSI-RS+CSI-IM. In some aspects, the resource types are not tied to CLI reporting metrics (e.g., RSRP, RSSI, SINR, or the like). In some aspects, the resource types are not tied to CLI reporting metrics. By way of example, NZP CSI-RS may be tied to CLI-SINR, ZP-CSI RS or CSI-IM may be tied to CLI-RSSI or CLI-RSRP, the combination of CSI RS and CSI-IM may be tied to CLI-RSSI, CLI-RSSI or CLI-RSRP, and SRS for CLI measurement (e.g., ZP SRS) may be tied to CLI-RSSI, CLI-RSSI or CLI-RSRP.

In some aspects, the configuration of CLI measurement resources 806 may configure the CLI measurement resources as CLI measurement resource subsets where each resource subset may include one or more CLI measurement resource. In some aspects, different resources in the same CLI measurement resource subset may be associated with different beams (which may also be referred to as "spatial filters").

In response to different conditions, beams may be switched. For example, a transmission configuration indication (TCI) state change may be transmitted by abase station so that the UE may switch to a new beam for the TCI state. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication. A TCI state may include quasi-co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed. The base station may indicate a TCI state to the UE as a transmission configuration that indicates QCL relationships between one signal (e.g., a reference signal) and the signal to be transmitted/received. For example, a TCI state may indicate a QCL relationship between DL RSs in one RS set and PDSCH/PDCCH DM-RS ports. TCI states can provide information about different beam selections for the UE to use for transmitting/receiving various signals. Under a unified TCI framework, different types of common TCI states may be indicated. For example, a type 1 TCI may be a joint DL/UL common TCI state to indicate a common beam for at least one DL channel or RS and at least one UL channel or RS. A type 2 TCI may be a separate DL (e.g., separate from UL) common TCI state to indicate a common beam for more than one DL channel or RS. A type 3 TCI may be a separate UL common TCI state to indicate a common beam for more than one UL channel/RS. A type 4 TCI may be a separate DL single channel or RS TCI state to indicate a beam for a single DL channel or RS. A type 5 TCI may be a separate UL single channel or RS TCI state to indicate a beam for a single UL channel or RS. A type 6 TCI may include UL spatial relation information (e.g., such as sounding reference signal (SRS) resource indicator (SRI)) to indicate a beam for a single UL channel or RS. An example RS may be an SSB, a tracking reference signal (TRS) and associated CSI-RS for tracking, a CSI-RS for beam management, a CSI-RS for CQI management, a DM-RS associated with non-UE-dedicated reception on PDSCH and a subset (which may be a full set) of control resource sets (CORESETs), or the like. A TCI state may be defined to represent at least one source RS to provide a reference (e.g., UE assumption) for determining quasi-co-location (QCL) or spatial filters. For example, a TCI state may define a QCL assumption between a source RS and a target RS. QCL may be of different types. Regarding the QCL types, QCL type A may include the Doppler shift, the Doppler spread, the average delay, and the delay spread; QCL type B may include the Doppler shift and the Doppler spread; QCL type C may include the Doppler shift and the average delay; and QCL type D may include the spatial Rx parameters (e.g., associated with beam information such as beamforming properties for finding a beam).

As another example, a spatial relation change, such as a spatial relation update, may trigger the UE to switch beams. Beamforming may be applied to uplink channels, such as but not limited to PUCCH. Beamforming may be based on configuring one or more spatial relations between the uplink and downlink signals. Spatial relation may indicate that a UE may transmit the uplink signal using the same beam as it used for receiving the corresponding downlink signal.

In some aspects, the configuration of CLI measurement resources 806 may configure the CLI measurement resources (which may still be referred to as "a set of CLI measurement resources") without indicating that the set of CLI measurement resources is a set. In some aspects where the configuration of CLI measurement resources 806 may configure the CLI measurement resources without indicating that the set of CLI measurement resources is a set, an activation, such as activation 808 transmitted from the network entity 804 to the UE 802, may activate different resources in the set of CLI measurement resources. In some aspects, the activation 808 may be a MAC control element (MAC CE).

In some aspects where the configuration of CLI measurement resources 806 may configure the CLI measurement resources as CLI measurement resource sets, the activation 808 may activate different subsets of configured CLI measurement resource. In some aspects, the activation 808 may be a joint activation for CLI measurement and reporting. In some aspects where the activation 808 is a joint activation for CLI measurement and reporting, the UE 802 may activate the CLI measurement resources at 810, perform CLI measurements at 812, and transmit the measurement result 814 based on the activation 808. In some aspects, there may be a one-to-one mapping between SP CLI measurement resource or resource subset and a respective L2 CLI report. For example, a SP CLI measurement resource type A 850 may be one-to-one mapped to a L2 CLI report A 852.

In some aspects, the activation 808 may be an activation for CLI measurement and there may be a separate activation (e.g., activation 811) for CLI reporting. In some aspects where the activation 808 may be an activation for CLI measurement and there may be an activation 811 for CLI reporting, the UE 802 may activate the CLI measurement resources at 810 based on the activation 808 and perform CLI measurements at 812 then transmit the measurement result 814 based on the activation 811. In some aspects, multiple reports may share a same measurement resource. For example, a SP CLI measurement resource type A 860 may be shared by a L2 CLI report A 862A and a L2 CLI report B 862B.

In some aspects, the activation 808 may activate the set of one or more CLI measurement resources at a set level. For example, the activation 808 may include an identifier (ID) associated with the set and upon receiving the activation 808, the UE 802 may activate the entire set accordingly. In some aspects, the activation 808 may activate a set of one or more CLI measurement resources at a subset level. For example, the activation 808 may activate the set of one or more CLI measurement resources at a subset level. For example, the activation 808 may include a bitmap where each bit in the bitmap corresponds to one resource in the set. For example, a bitmap with entries "1100" may represent that the first two resources are activated while the last two resources are not activated. In some aspects, the activation 808 may activate the set of one or more CLI measurement resources at an individual resource level. For example, the activation 808 include one or more resource IDs of the resources to be activated or one or more resource IDs of the resources that are not being activated.

In some aspects, the activation 808 may be a MAC-CE and may include QCL (which may correspond to TCI state and spatial relation) information for the resources. In some aspects where the activation 808 may activate the set of one or more CLI measurement resources at a set level, the activation 808 may be a MAC-CE that includes QCL information, such as a list of QCL information where each entry in the list maps to one CLI measurement resource. For example, the activation 808 may be activating SP SRS or SP CSI-RS. In some aspects where the activation 808 may activate the set of one or more CLI measurement resources at a subset level or resource level, the activation 808 may be a MAC-CE that includes either (1) QCL information for the resources to be activated, such as a list of QCL information where each entry in the list maps to one CLI measurement resource that is being activated, (2) QCL information for the resources to be activated and QCL update information for resources that are already active, such as a list of QCL information where each entry in the list maps to one CLI measurement resource that is being activated and a second list of QCL update information where each entry in the list maps to one CLI measurement resource that is active, or (3) QCL information for all resources in the set of one or more CLI measurement resources independent of whether the resource is being activated or not.

In some aspects, the UE 802 and the network entity 804 may communicate (e.g., by transmitting or receiving transmission 816) based on the measurement result 814. For example, the network entity 804 may determine that CLI is not large based on the measurement result 814 and proceed with transmitting or receiving (e.g., schedule transmission or reception of) the transmission 816. In some aspects, the network entity 804 may transmit a deactivation 818 for deactivating at least one resource in the set of one or more CLI measurement resources. In some aspects, the deactivation 818 may be a joint deactivation that also deactivated reporting of measurement results. In some aspects, the network entity 804 may also transmit a deactivation 820 for deactivating reporting based on measurement on at least one resource in the set of one or more CLI measurement resources.

In some aspects, there may be timing configuration(s) associated with the activation 808, the activation 811, the deactivation 818, or the deactivation 820. For example, the timing configuration(s) may represent the amount of time that the UE 802 may use to decode the activation or the deactivation and make one or more changes to UE behavior based on the activation or the deactivation. In some aspects, a same timing configuration may be applied to both activation and deactivation. In some aspects, different timing configurations may be applied to activation and deactivation.

In some aspects, when the UE 802 receives an activation command (e.g., the activation 808) for SP CLI measurement resource(s)/resource-set(s) and when the UE 802 may transmit a PUCCH with HARQ-ACK information in slot n corresponding to the PDSCH carrying the command, the corresponding actions in and the UE assumptions (including QCL assumptions) may be applied starting from the first slot that is one of: 1) after slot $n+3N_{slot}^{subframe,\mu}$, 2) after slot $n+X \cdot N_{slot}^{subframe,\mu}+Y$, 3) after slot $n+X \cdot N_{slot}^{subframe,\mu}$, where X depends on UE capability, or 4) after slot $n+X \cdot N_{slot}^{subframe,\mu}+Y$, where X<3 and Y depend on UE capability. The parameter $N_{slot}^{subframe,\mu}$ may represent a number of slots per subframe for a subcarrier spacing represented by μ. Slot n may be a slot associated with an acknowledgment of the activation.

In some aspects, when the UE 802 receives a deactivation command (e.g., the deactivation 818) for SP CLI measurement resource(s)/resource-set(s) and when the UE 802 may transmit a PUCCH with HARQ-ACK information in slot n corresponding to the PDSCH carrying the command, the corresponding actions and the UE assumptions (including QCL assumptions) may be applied starting from the first slot that is one of: (1) after slot $n+3N_{slot}^{subframe,\mu}$, (2) after slot $n+X \cdot N_{slot}^{subframe,\mu}+Y$, (3) after slot $n+X \cdot N_{slot}^{subframe,\mu}$, where X depends on UE capability, or (4) after slot $n+X \cdot N_{slot}^{subframe,\mu}+Y$, where X<3 and Y depend on UE capability. The parameter $N_{slot}^{subframe,\mu}$ may represent a number of slots per subframe for a subcarrier spacing represented by μ. Slot n may be a slot associated with an acknowledgment of the deactivation.

Figure 9:
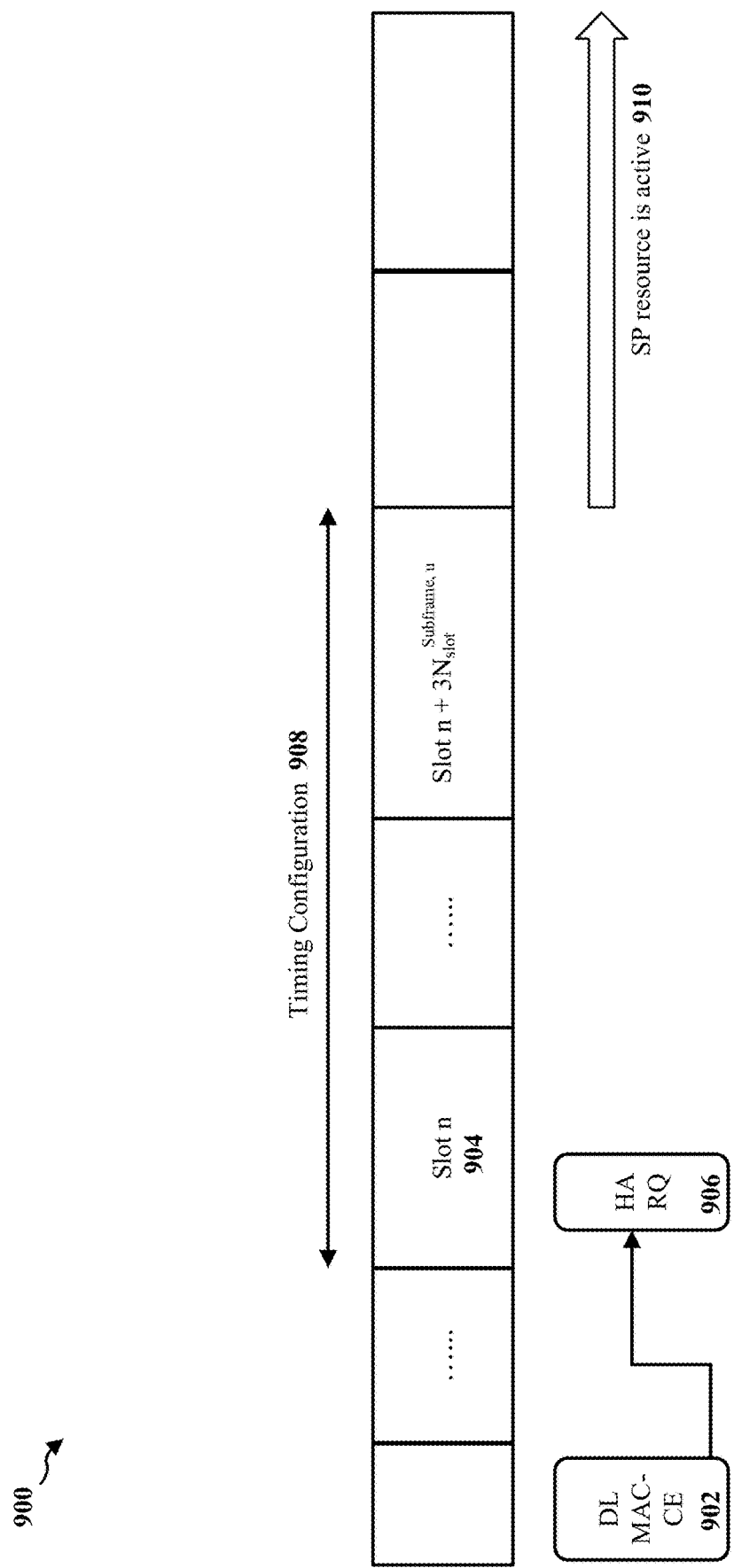
FIG. 9 is a diagram illustrating an example timing configuration.

FIG. 9 is a diagram 900 illustrating an example timing configuration. As illustrated in FIG. 9, upon receiving an activation in DL MAC-CE 902, the UE may transmit an HARQ ACK (e.g., ACK 906). The slot in which the UE transmits the ACK 906 in may be slot n 904. Based on the timing configuration 908 which may represent that the corresponding actions in and the UE assumptions (including QCL assumptions) may be applied starting from the first slot after slot $n+3N_{slot}^{subframe,\mu}$ the UE may activate the corresponding measurement resources at 910.

In some aspects, timing configurations for activation (e.g., activation 811) or deactivation (deactivation 820) for L2 CLI reporting may be the same, where a same timing configuration applied to both activation and deactivation. In some aspects, timing configurations for activation (e.g., activation 811) or deactivation (deactivation 820) for L2 CLI reporting may be different, where different timing configurations may be applied to activation and deactivation. In some aspects, when the UE 802 would transmit a PUCCH with HARQ-ACK information in slot 'n' corresponding to the PDSCH carrying the activation command (e.g., the activation 811) of L2 CLI reporting, the indicated L2 CLI report may be applied starting from the first slot that is one of: 1) after slot $n+3N_{slot}^{subframe,\mu}$, (2) after slot $n+X \cdot N_{slot}^{subframe,\mu}+Y$, (3) after slot $n+X \cdot N_{slot}^{subframe,\mu}$, where X depends on UE capability, or (4) after slot $n+X \cdot N_{slot}^{subframe,\mu}+Y$, where X<3 and Y depend on UE capability, where different timing configurations may be applied to activation and deactivation. In some aspects, when the UE 802 would transmit a PUCCH with HARQ-ACK information in slot 'n' corresponding to the PDSCH carrying the deactivation command (e.g., the deactivation 820) of L2 CLI reporting, the indicated L2 CLI report may be deactivated starting from the first slot that is one of: 1) after slot $n+3N_{slot}^{subframe,\mu}$, (2) after slot $n+X \cdot N_{slot}^{subframe,\mu}+Y$, (3) after slot $n+X \cdot N_{slot}^{subframe,\mu}$, where X depends on UE capability, or (4) after slot $n+X \cdot N_{slot}^{subframe,\mu}+Y$, where X<3 and Y depend on UE capability.

In some aspects where the activation 808 is a joint activation activating L2 CLI measurement resources and reporting, a same timing configuration may be associated with the activation of the measurement resources and the activation of the reporting. For example, when the UE 802 may transmit a PUCCH with HARQ-ACK information in slot n corresponding to the PDSCH carrying the command, the corresponding actions and the UE assumptions (including QCL assumptions) may be applied starting from the first slot that is one of: (1) after slot $n+3N_{slot}^{subframe,\mu}$, (2) after slot $n+X \cdot N_{slot}^{subframe,\mu}+Y$, (3) after slot $n+X \cdot N_{slot}^{subframe,\mu}$, where X depends on UE capability, or (4) after slot $n+X \cdot N_{slot}^{subframe,\mu}+Y$, where X<3 and Y depend on UE capability. In some aspects where the activation 808 is a joint activation activating L2 CLI measurement resources and reporting, different timing configurations may be associated with the activation of the measurement resources and the activation of the reporting. In some aspects, a more relaxed timing configuration of the different timing configurations may be used by the UE for both the activation of the measurement resources and the activation of the reporting. For example, if timing configuration of $n+3N_{slot}^{subframe,\mu}$ is associated with the activation of the CLI measurement resources and timing configuration of $n+4N_{slot}^{subframe,\mu}$ is associated with the activation of the CLI reporting, $n+3N \ N_{slot}^{subframe,\mu}$ frame may be applied because it's the more relaxed timing configuration. In some aspects, a stricter timing configuration of the different timing configurations may be used by the UE for both the activation of the measurement resources and the activation of the reporting. For example, if timing configuration of $n+3N_{slot}^{subframe,\mu}$ is associated with the activation of the CLI measurement resources and timing configuration of $n+4N_{slot}^{subframe,\mu}$ is associated with the activation of the CLI reporting, $n+4N_{slot}^{subframe,\mu}$ may be applied because it's the stricter timing configuration. In some aspects, the timing configuration associated with the activation of the CLI measurement resources may be applied. In some aspects, the timing configuration associated with the activation of the CLI reporting may be applied.

In some aspects where the deactivation 818 is a joint deactivation deactivating L2 CLI measurement resources and reporting, a same timing configuration may be associated with the deactivation of the measurement resources and the deactivation of the reporting. For example, when the UE 802 may transmit a PUCCH with HARQ-ACK information in slot n corresponding to the PDSCH carrying the command, the corresponding actions and the UE assumptions (including QCL assumptions) may be applied starting from the first slot that is one of: (1) after slot $n+3N_{slot}^{subframe,\mu}$, (2) after slot $n+X \cdot N \ N_{slot}^{subframe,\mu}+Y$, (3) after slot $n+X \cdot N_{slot}^{subframe,\mu}$, where X depends on UE capability, or (4) after slot $n+X \cdot N_{slot}^{subframe,\mu}+Y$, where X<3 and Y depend on UE capability. In some aspects where the deactivation 818 is a joint activation deactivating L2 CLI measurement resources and reporting, different timing configurations may be associated with the deactivation of the measurement resources and the deactivation of the reporting. In some aspects, a more relaxed timing configuration of the different timing configurations may be used by the UE for both the deactivation of the measurement resources and the deactivation of the reporting. For example, if timing configuration of $n+3N_{slot}^{subframe,\mu}$ is associated with the deactivation of the CLI measurement resources and timing configuration of $n+4N \ N_{slot}^{subframe,\mu}$ is associated with the deactivation of the CLI reporting, $n+3N \ N_{slot}^{subframe,\mu}$ may be applied because it's the more relaxed timing configuration. In some aspects, a stricter timing configuration of the different timing configurations may be used by the UE for both the deactivation of the measurement resources and the deactivation of the reporting. For example, if timing configuration of n+3N $N_{slot}^{subframe,\mu}$, is associated with the deactivation of the CLI measurement resources and timing configuration of n+4N$_{slot}^{subframe,\mu}$ is associated with the deactivation of g slot the CLI reporting, n+4N$_{slot}^{subframe,\mu}$ may be applied because it's the stricter timing configuration. In some aspects, the timing configuration associated with the deactivation of the CLI measurement resources may be applied. In some aspects, the timing configuration associated with the deactivation of the L2 CLI reporting may be applied.

In some aspects, if the UE 802 has an active SP CLI measurement resource configuration, the activated configuration may be considered to be active when the corresponding DL bandwidth part (BWP) is active. When the corresponding DL BWP is inactive, the SP CLI measurement resource configuration may be considered suspended. In some aspects, if the UE 802 is configured with carrier deactivation, semi-persistent CLI measurement resource(s)/resource-set may also be deactivated. If the UE 802 is in an active L2 CLI reporting and has not received a deactivation command (e.g., the deactivation 818 or the deactivation 820), the L2 CLI reporting may be performed when the BWP in which the reporting is configured to be on is the active BWP, otherwise the L2 CLI reporting may be suspended.

Figure 10:
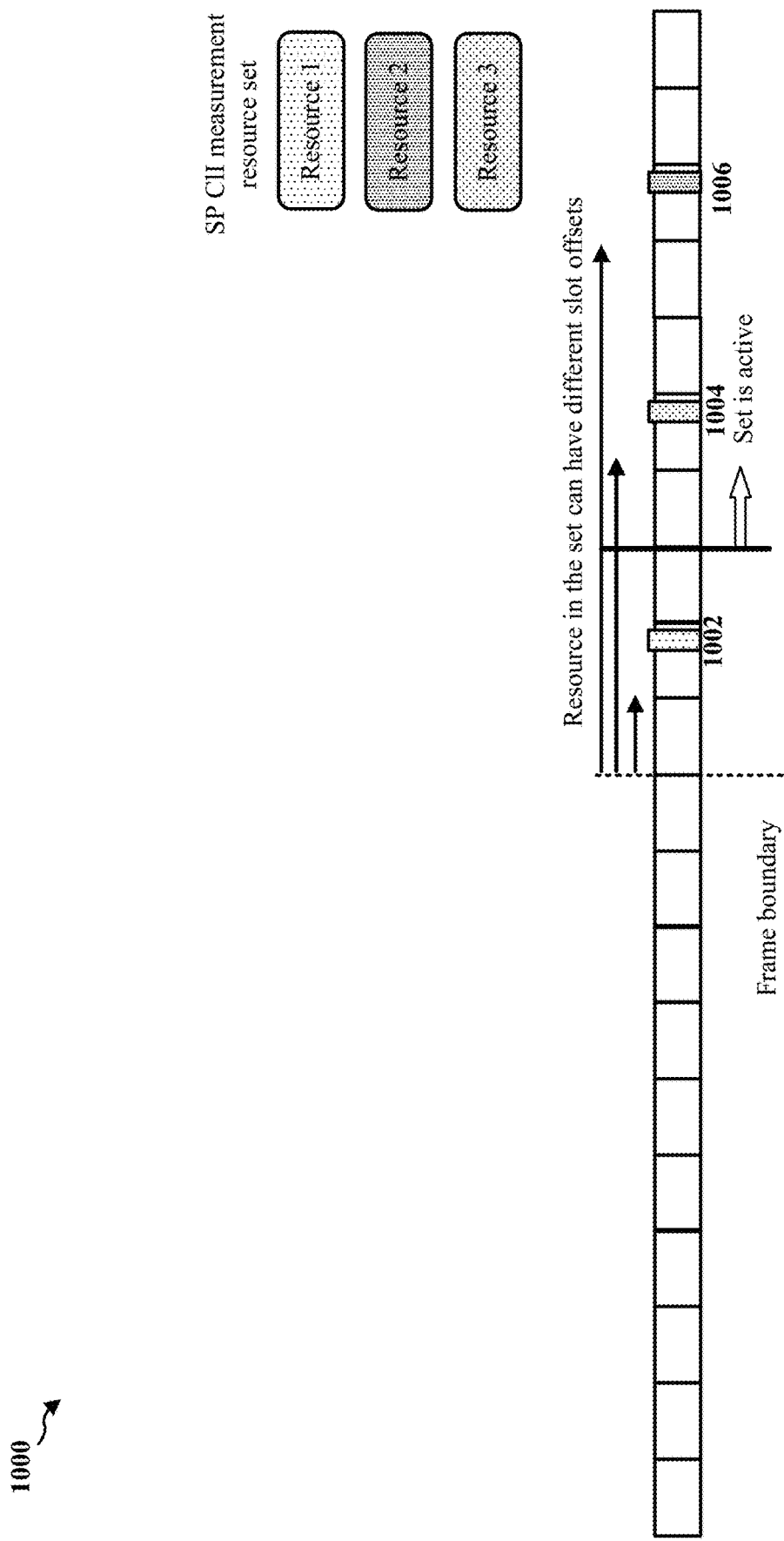
FIG. 10 is a diagram illustrating an example timing configuration.

FIG. 10 is a diagram 1000 illustrating an example timing configuration. In some aspects, an SP CLI measurement resource set may contain one or more resources and the difference resources may have different slot-offsets. In some aspects, when L2 CLI reporting is activated (e.g., based on activation 808 or activation 811), some of occasions of the resources in the SP CLI measurement resource set (e.g., at 1002) can occur before the first slot where L2 CLI reporting is consider to be active based on the timing configuration. In some aspects, the first L2 CLI report may include measurements from occurrences of some of resources in the first epoch (e.g., measurement from a first occurrence of slot 1004 and 1006 may be included). In some aspects, the first L2 CLI report doesn't include the measurements from the first epoch if some resources are before first active slot (e.g., measurement from a first occurrence of slot 1004 and 1006 may not be included).

Figure 11:
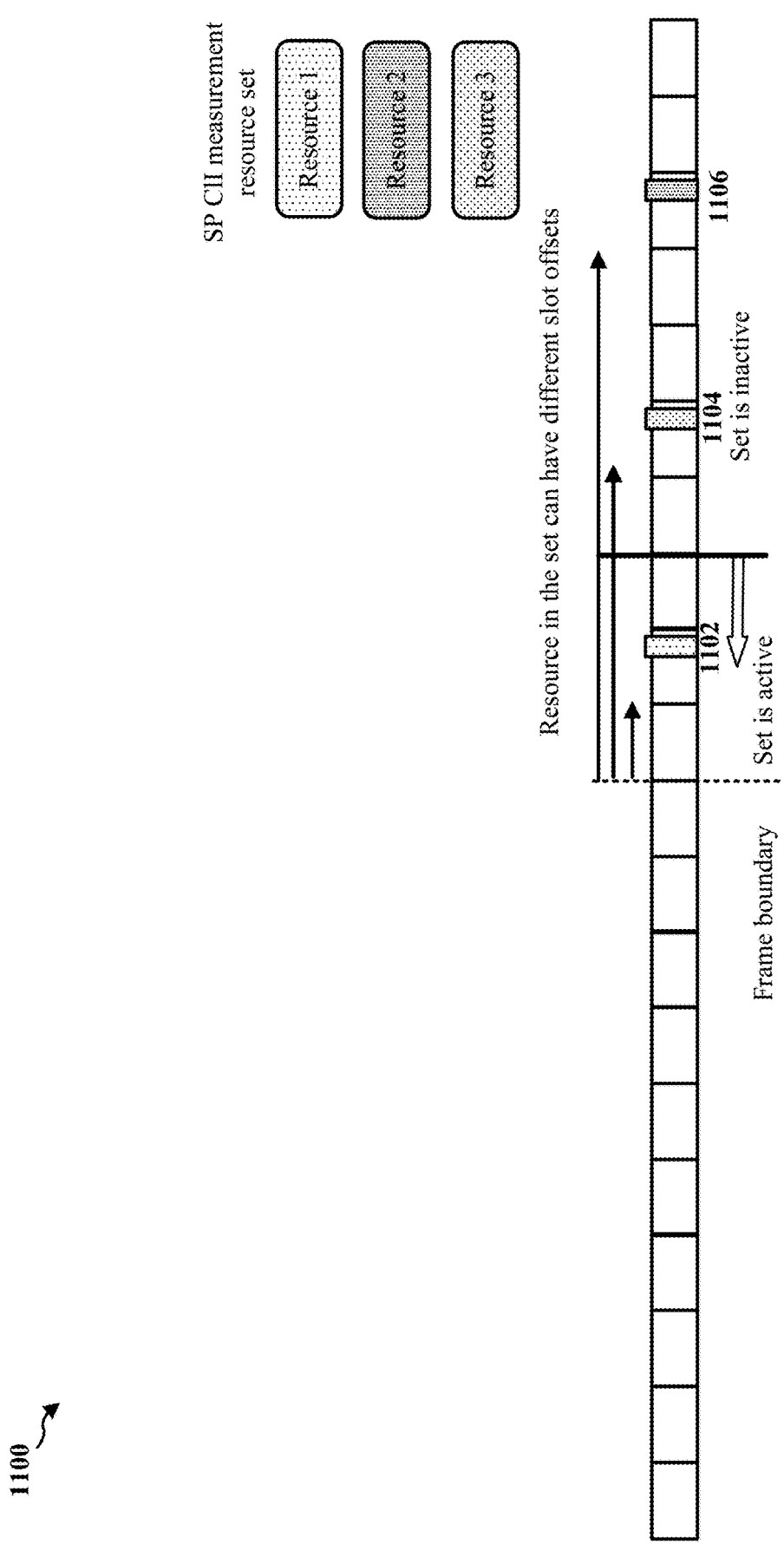
FIG. 11 is a diagram illustrating an example timing configuration.

FIG. 11 is a diagram 1100 illustrating an example timing configuration. In some aspects, an SP CLI measurement resource set may contain one or more resources and the difference resources may have different slot-offsets. In some aspects, when L2 CLI reporting is deactivated (e.g., based on deactivation 818 or deactivation 820), some of occasions of the resources (e.g., 1104 and 1106) in the SP CLI measurement resource set may occur after the first slot where L2 CLI reporting is consider to be inactive based on the timing configuration. In some aspects, the last L2 CLI report may include measurements from occurrences of some of resources in the last epoch (e.g., measurement from a last occurrence of slot 1102 may be included). In some aspects, the last L2 CLI report doesn't include the measurements from the last epoch if some resources are after set is inactive (e.g., measurement from a last occurrence of slot 1102 may not be included).

Figure 12:
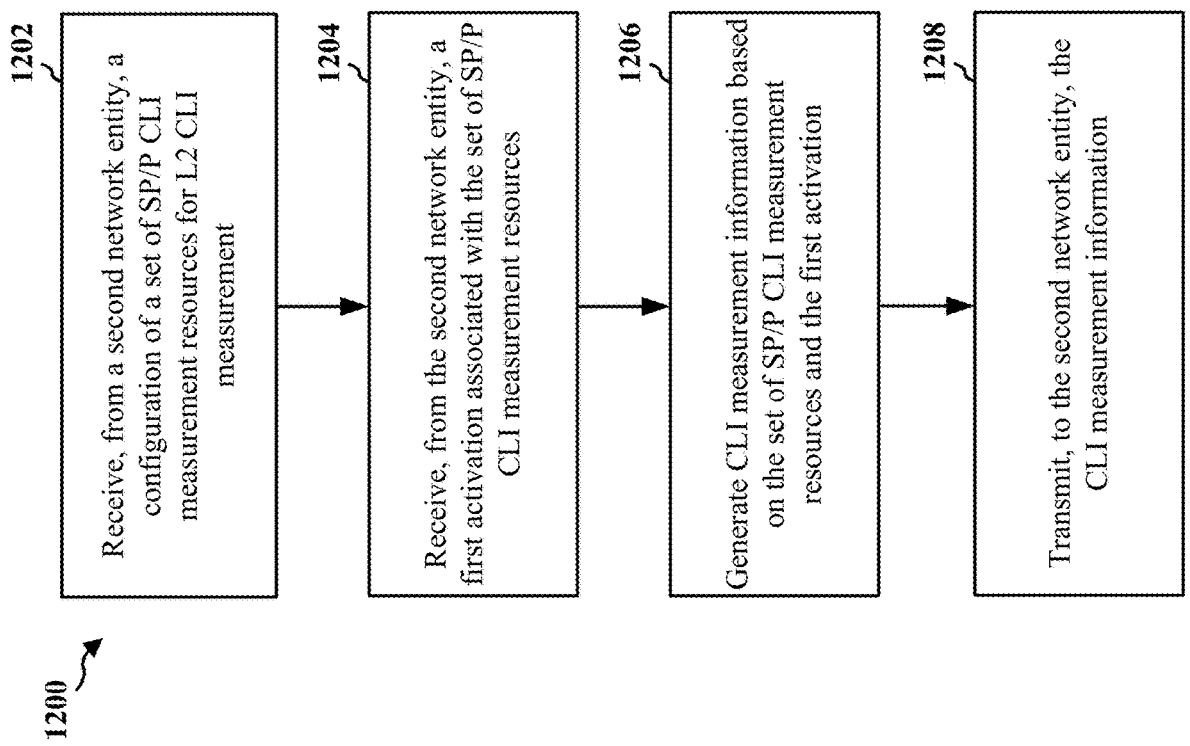
FIG. 12 is a flowchart of a method of wireless communication.

FIG. 12 is a flowchart 1200 of a method of wireless communication. The method may be performed by a UE (e.g., the UE 104, the UE 802; the apparatus 1604). The UE may include at least one processor coupled to a memory.

At 1202, the UE may receive, from a second network entity, a configuration of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. For example, the UE 802 may receive, from a second network entity, a configuration (e.g., 806) of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. In some aspects, 1202 may be performed by the CLI component 198.

At 1204, the UE may receive, from the second network entity, a first activation associated with the set of SP/P CLI measurement resources. For example, the UE 802 may receive, from the second network entity, a first activation (e.g., 808) associated with the set of SP/P CLI measurement resources. In some aspects, 1204 may be performed by the CLI component 198.

At 1206, the UE may generate CLI measurement information based on the set of SP/P CLI measurement resources and the first activation. For example, the UE 802 may generate CLI measurement information (e.g., at 812) based on the set of SP/P CLI measurement resources and the first activation. In some aspects, 1206 may be performed by the CLI component 198.

At 1208, the UE may transmit, to the second network entity, the CLI measurement information. For example, the UE 802 may transmit, to the second network entity, the CLI measurement information (e.g., 814). In some aspects, 1206 may be performed by the CLI component 198.

Figure 13:
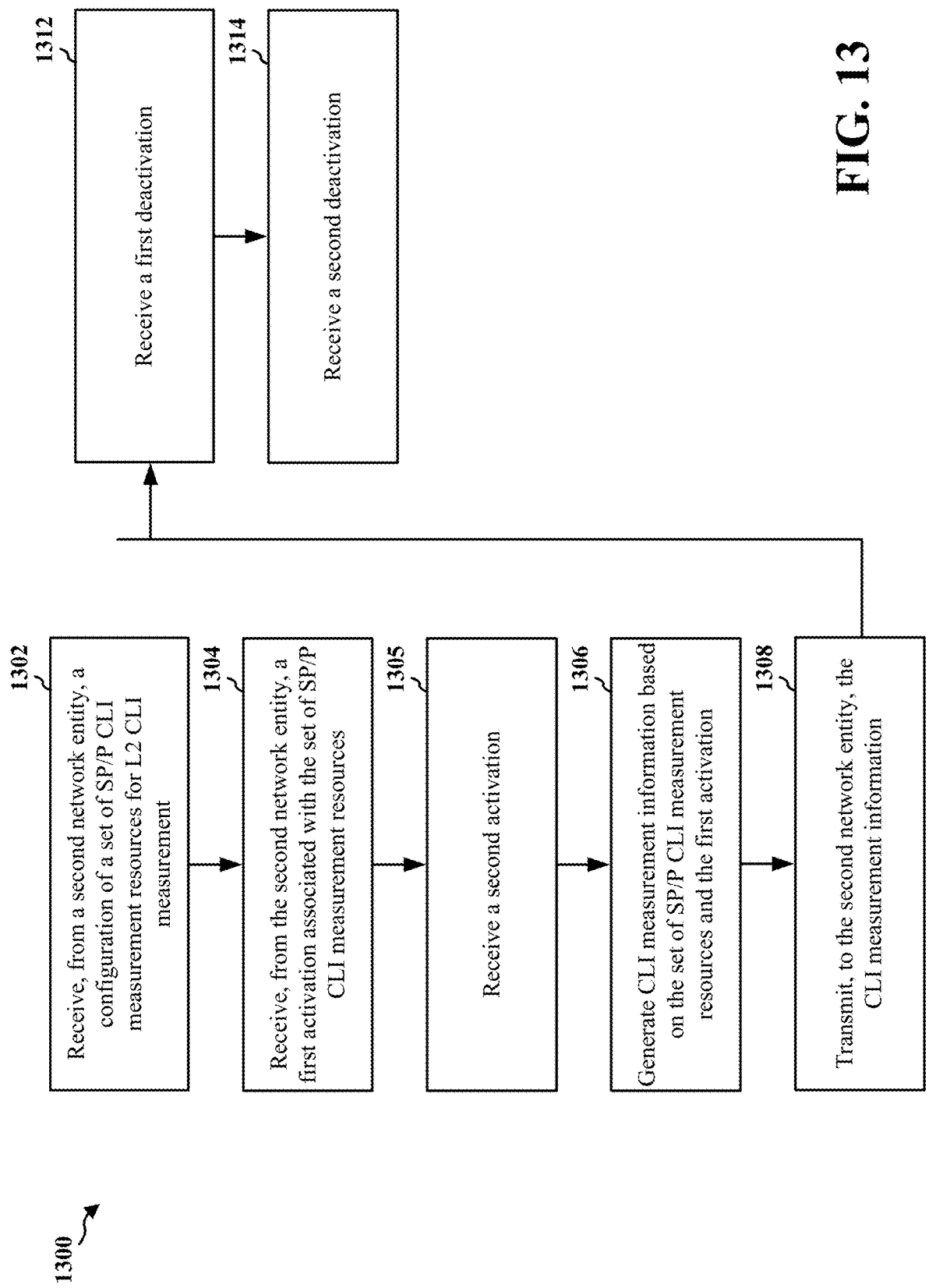
FIG. 13 is a flowchart of a method of wireless communication.

FIG. 13 is a flowchart 1300 of a method of wireless communication. The method may be performed by a UE (e.g., the UE 104, the UE 802; the apparatus 1604). The UE may include at least one processor coupled to a memory.

At 1302, the UE may receive, from a second network entity, a configuration of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. For example, the UE 802 may receive, from a second network entity, a configuration (e.g., 806) of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. In some aspects, 1302 may be performed by the CLI component 198. In some aspects, the one or more measurement resource types are not tied to the respective CLI reporting metric. In some aspects, the one or more measurement resource types are tied to the at least one respective CLI reporting metric, where the ZP SRS is tied to a RSRP, a RSSI, or a SINR, where the NZP CSI RS is tied to the RSSI and the RSRP, where the CSI IM is tied to the RSSI or the RSRP, and where the combination is tied to the RSSI, the RSRP, and the SINR. In some aspects, the configuration of the set of SP/P CLI measurement resources indicates one or more time and frequency resources, and where the configuration of the set of SP/P CLI measurement resources indicates the one or more time and frequency resources as a resource set. In some aspects, the configuration is active when a downlink BWP associated with the configuration is active. In some aspects, the configuration is inactive when a carrier associated with the configuration is deactivated. In some aspects, the configuration is inactive when a BWP associated with the configuration is deactivated.

At 1304, the UE may receive, from the second network entity, a first activation associated with the set of SP/P CLI measurement resources. For example, the UE 802 may receive, from the second network entity, a first activation (e.g., 808) associated with the set of SP/P CLI measurement resources. In some aspects, 1304 may be performed by the CLI component 198. In some aspects, the first activation indicates one or more time and frequency resources associated with the set of SP/P CLI measurement resources, and where the configuration of the set of SP/P CLI measurement resources does not indicate the one or more time and frequency resources as a resource set. In some aspects, the first activation is a MAC CE, and where the first activation includes an ID of the set of SP/P CLI measurement resources, and where the first activation is configured to activate the set of SP/P CLI measurement resources. In some aspects, the first activation includes a list including the respective QCL information that maps to each respective resource in the set of SP/P CLI measurement resources. In some aspects, the first activation is a MAC CE, and where the first activation includes a bitmap associated with the set of SP/P CLI measurement resources and is configured to activate a subset of the set of SP/P CLI measurement resources, where each bit in the bitmap corresponds to one respective resource in the set of SP/P CLI measurement resources. In some aspects, the first activation is configured to activate a subset of the set of SP/P CLI measurement resources, and where the first activation includes: respective QCL information that maps to each respective resource of the set of SP/P CLI measurement resources, or respective QCL information that maps to each respective resource of the subset of CLI SP/P CLI measurement resources. In some aspects, the first activation is configured to activate a subset of the set of SP/P CLI measurement resources, and where the first activation includes a first list of QCL information and a second list of QCL update information, where each respective QCL information in the first list maps to a respective resource of the subset of SP/P CLI measurement resources, and where each respective QCL update information in the second list maps to a respective resource of a second active subset in the set of SP/P CLI measurement resources. In some aspects, the first activation is a MAC CE, and where the first activation includes one or more resource IDs, where each respective resource ID of the resource IDs is associated with a respective resource of the set of SP/P CLI measurement resources, and where the first activation is configured to activate the respective resource. In some aspects, the first activation includes a list of QCL information, and where each respective QCL information in the list maps to a respective resource of the set of SP/P CLI measurement resources.

At 1305, the UE may receive a second activation. For example, the UE 802 may receive a second activation (e.g., 811). In some aspects, 1310 may be performed by the CLI component 198. In some aspects, the first activation is a first MAC CE, where the at least one processor is configured to: receive a second activation, where, to transmit the CLI measurement information, the at least one processor is configured to transmit of the CLI measurement information based on the second activation, and where the second activation is a second MAC CE different from the first MAC CE. In some aspects, to transmit the CLI measurement information, the at least one processor is configured to transmit of the CLI measurement information based on the second activation.

At 1306, the UE may generate CLI measurement information based on the set of SP/P CLI measurement resources and the first activation. For example, the UE 802 may generate CLI measurement information (e.g., at 812) based on the set of SP/P CLI measurement resources and the first activation. In some aspects, 1306 may be performed by the CLI component 198.

At 1308, the UE may transmit, to the second network entity, the CLI measurement information. For example, the UE 802 may transmit, to the second network entity, the CLI measurement information (e.g., 814). In some aspects, 1308 may be performed by the CLI component 198.

At 1312, the UE may receive a first deactivation associated with the set of SP/P CLI measurement resources. For example, the UE 802 may receive a first deactivation (e.g., 818) associated with the set of SP/P CLI measurement resources. In some aspects, 1312 may be performed by the CLI component 198.

At 1314, the UE may receive a second deactivation configured to deactivate generation of second CLI measurement information based on the set of SP/P CLI measurement resources. For example, the UE 802 may receive a second deactivation (e.g., 820) configured to deactivate generation of second CLI measurement information based on the set of SP/P CLI measurement resources. In some aspects, 1314 may be performed by the CLI component 198.

In some aspects, a first timing configuration associated with the first deactivation is equivalent to a second timing configuration associated with the first activation. In some aspects, a first timing configuration associated with the first deactivation is different from a second timing configuration associated with the first activation. In some aspects, a first timing configuration is associated with the first deactivation and a second timing configuration is associated with the first activation, and where the second timing configuration represents an application of the first activation after one of: a first quantity of slots independent of a capability associated with the first network entity, or a second quantity of slots based on the capability. In some aspects, the second quantity equals one of: $n+X \cdot N_{slot}^{subframe,\mu}$ or $n+Z \cdot N_{slot}^{subframe,\mu}+Y$, where X is a first positive integer based on the capability, where Y is a second positive integer based on the capability, where Z is a third positive integer independent of the capability, where n is associated with a slot n associated with an acknowledgment (ACK) associated with the first activation, and where $N_{slot}^{subframe,\mu}$ represents a number of slots per subframe for a subcarrier spacing represented by p. In some aspects, a first timing configuration is associated with the first deactivation and a second timing configuration is associated with the first activation, and where the first timing configuration represents an application of the first deactivation after one of: a first quantity of slots independent of a capability associated with the first network entity, or a second quantity of slots based on the capability. In some aspects, the second quantity equals one of: $n+X \cdot N_{slot}^{subframe,\mu}$ or $n+Z \cdot N_{slot}^{subframe,\mu}+Y$, where X is a first positive integer based on the capability, where Y is a second positive integer based on the capability, where Z is a third positive integer independent of the capability, where n is associated with a slot n associated with an acknowledgment (ACK) associated with the first deactivation, and where $N_{slot}^{subframe,\mu}$, represent a number of slots per subframe for a subcarrier spacing represented by μ. In some aspects, a first timing configuration associated with the second deactivation is equivalent to a second timing configuration associated with the second activation. In some aspects, a first timing configuration associated with the second deactivation is different from a second timing configuration associated with the second activation In some aspects, a first timing configuration is associated with the second deactivation and a second timing configuration is associated with the second activation, and where the second timing configuration represents an application of the second activation after one of: a first quantity of slots independent of a capability associated with the first network entity, or a second quantity of slots based on the capability. In some aspects, the second quantity equals one of: $n+X \cdot N_{slot}^{subframe,\mu}$ or $n+Z \cdot N_{slot}^{subframe,\mu}+Y$, where X is a first positive integer based on the capability, where Y is a second positive integer based on the capability, where Z is a third positive integer independent of the capability, where n is associated with a slot n associated with an acknowledgment (ACK) associated with the second activation, and where $N_{slot}^{subframe,\mu}$ represent a number of slots per subframe for a subcarrier spacing represented by p. In some aspects, a first timing configuration is associated with the second deactivation and a second timing configuration is associated with the second activation, and where the first timing configuration represents an application of the second deactivation after one of: a first quantity of slots independent of a capability associated with the first network entity, or a second quantity of slots based on the capability. In some aspects, the second quantity equals one of: $n+X \cdot N_{slot}^{subframe,\mu}$ or $n+Z \cdot N_{slot}^{subframe,\mu}+Y$, where X is a first positive integer based on the capability, where Y is a second positive integer based on the capability, where Z is a third positive integer independent of the capability, where n is associated with a slot n associated with an acknowledgment (ACK) associated with the second deactivation, and where $N_{slot}^{subframe,\mu}$ represent a number of slots per subframe for a subcarrier spacing represented by p. In some aspects, a timing configuration is associated with the second activation, and where at least one resource earlier in time than an application of the second activation based on the timing configuration is included or excluded in the set of measurements. In some aspects, a timing configuration is associated with the second deactivation, and where at least one resource earlier in time than an application of the second deactivation based on the timing configuration is included or excluded in the set of measurements. In some aspects, a joint activation in a first MAC CE includes the first activation and the second activation, and where a joint deactivation in a second MAC CE includes the first deactivation and the second deactivation, where a first timing configuration is associated with the first activation, a second timing configuration is associated with the second activation, a third timing configuration is associated with the first deactivation, and a fourth timing configuration is associated with the second deactivation. In some aspects, the first timing configuration is equivalent to the second timing configuration, and where the third timing configuration is equivalent to the fourth timing configuration. In some aspects, the UE may apply one of the first timing configuration or the second timing configuration based on one of: a first relaxed timing configuration of the first timing configuration or the second timing configuration, the first timing configuration, the second timing configuration, or a first stricter timing configuration of the first timing configuration or the second timing configuration. In some aspects, the UE may apply one of the third timing configuration or the fourth timing configuration based on one of: a second relaxed timing configuration of the third timing configuration or the fourth timing configuration, the third timing configuration, the fourth timing configuration, or a second stricter timing configuration of the third timing configuration or the fourth timing configuration.

Figure 14:
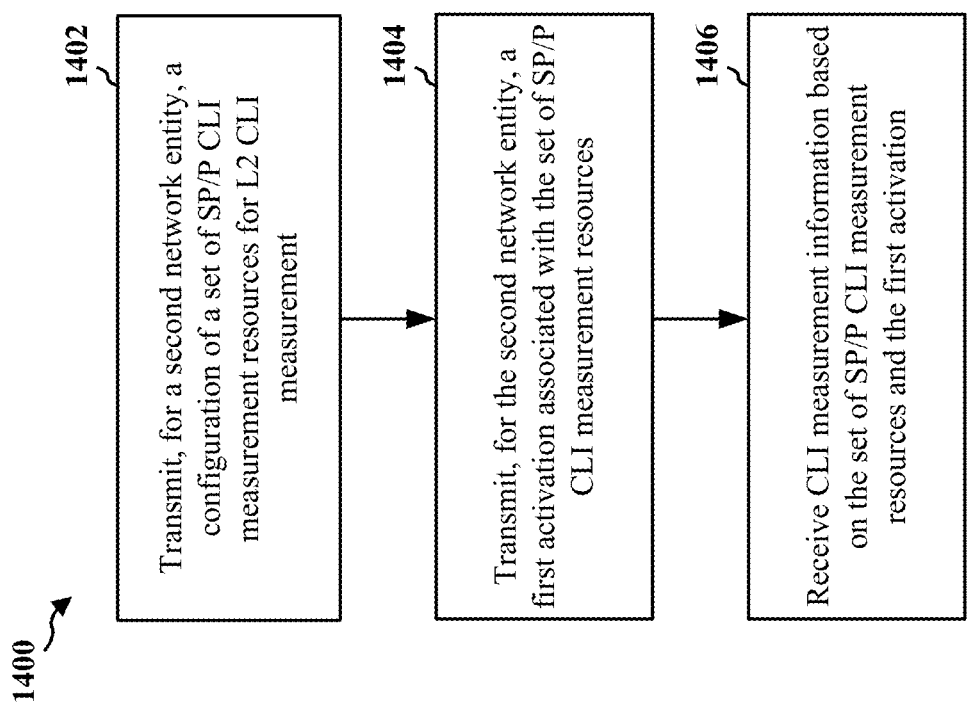
FIG. 14 is a flowchart of a method of wireless communication.

FIG. 14 is a flowchart 1400 of a method of wireless communication. The method may be performed by a network entity (e.g., the base station 102, the network entity 804, the network entity 1602, the network entity 1702).

At 1402, the network entity may transmit, for a second network entity, a configuration of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. For example, the network entity 804 may transmit, for a second network entity (e.g., the UE 802), a configuration (e.g., 806) of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. In some aspects, 1402 may be performed by the CLI component 199.

At 1404, the network entity may transmit, for the second network entity, a first activation associated with the set of SP/P CLI measurement resources. For example, the network entity 804 may transmit, for the second network entity (e.g., the UE 802), a first activation (e.g., 808) associated with the set of SP/P CLI measurement resources. In some aspects, 1404 may be performed by the CLI component 199.

At 1406, the network entity may receive CLI measurement information based on the set of SP/P CLI measurement resources and the first activation. For example, the network entity 804 may receive CLI measurement information (e.g., 814) based on the set of SP/P CLI measurement resources and the first activation. In some aspects, 1406 may be performed by the CLI component 199.

Figure 15:
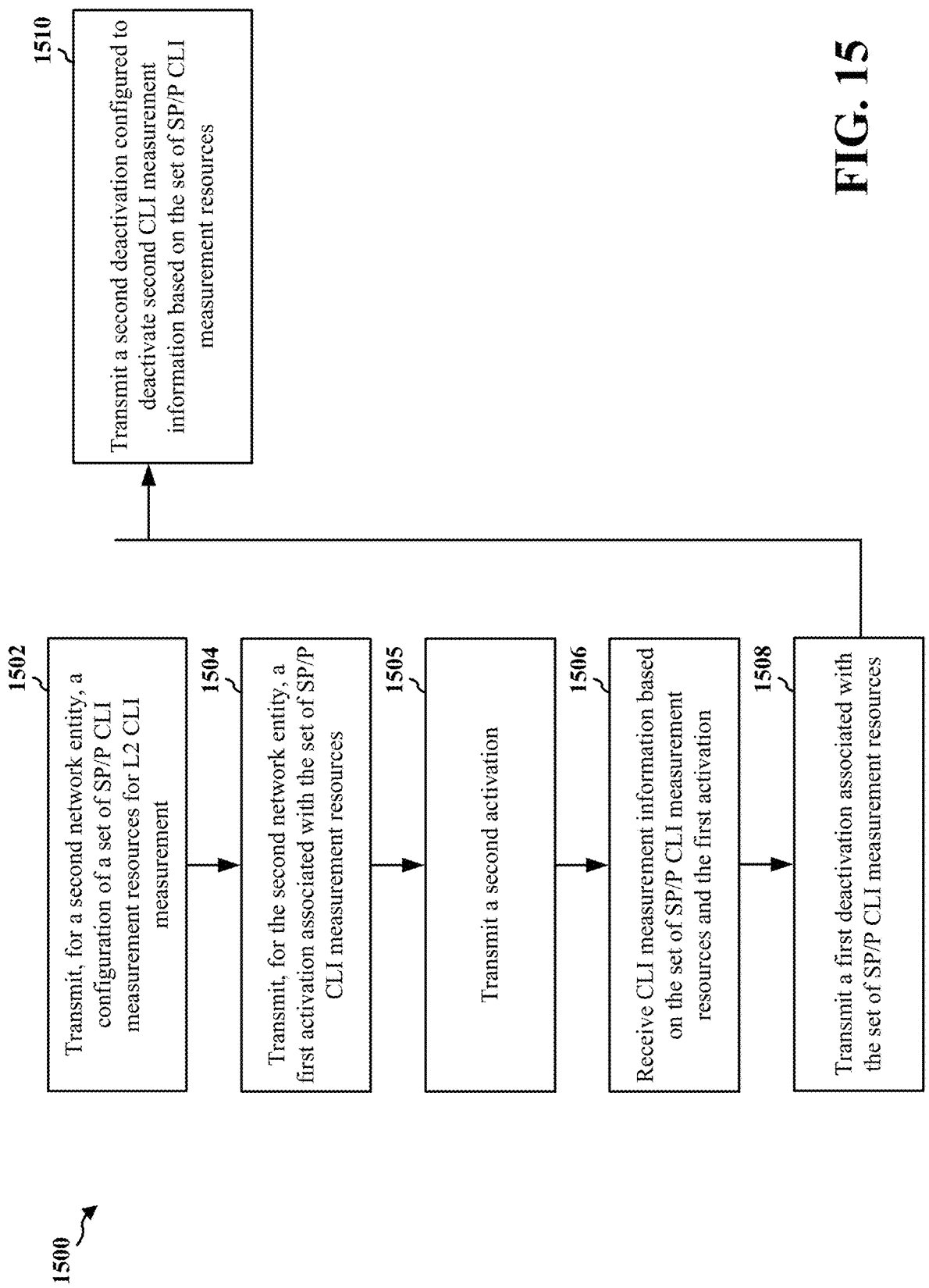
FIG. 15 is a flowchart of a method of wireless communication.

FIG. 15 is a flowchart 1500 of a method of wireless communication. The method may be performed by a network entity (e.g., the base station 102, the network entity 804, the network entity 1602, the network entity 1702).

At 1502, the network entity may transmit, for a second network entity, a configuration of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. For example, the network entity 804 may transmit, for a second network entity (e.g., the UE 802), a configuration (e.g., 806) of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. In some aspects, 1502 may be performed by the CLI component 199. In some aspects, the one or more measurement resource types are not tied to the respective CLI reporting metric. In some aspects, the one or more measurement resource types are tied to the at least one respective CLI reporting metric, where the ZP SRS is tied to a RSRP, a RSSI, or a SINR, where the NZP CSI RS is tied to the RSSI and the RSRP, where the CSI IM is tied to the RSSI or the RSRP, and where the combination is tied to the RSSI, the RSRP, and the SINR. In some aspects, the configuration of the set of SP/P CLI measurement resources indicates one or more time and frequency resources, and where the configuration of the set of SP/P CLI measurement resources indicates the one or more time and frequency resources as a resource set.

At 1504, the network entity may transmit, for the second network entity, a first activation associated with the set of SP/P CLI measurement resources. For example, the network entity 804 may transmit, for the second network entity (e.g., the UE 802), a first activation (e.g., 808) associated with the set of SP/P CLI measurement resources. In some aspects, 1504 may be performed by the CLI component 199. In some aspects, the first activation indicates one or more time and frequency resources associated with the set of SP/P CLI measurement resources, and where the configuration of the set of SP/P CLI measurement resources does not indicate the one or more time and frequency resources as a resource set. In some aspects, the first activation is a MAC CE, and where the first activation includes an ID of the set of SP/P CLI measurement resources, and where the first activation is configured to activate the set of SP/P CLI measurement resources. In some aspects, the first activation includes a list including the respective QCL information that maps to each respective resource in the set of SP/P CLI measurement resources. In some aspects, the first activation is a MAC CE, and where the first activation includes a bitmap associated with the set of SP/P CLI measurement resources and is configured to activate a subset of the set of SP/P CLI measurement resources, where each bit in the bitmap corresponds to one respective resource in the set of SP/P CLI measurement resources. In some aspects, the first activation is configured to activate a subset of the set of SP/P CLI measurement resources, and where the first activation includes: respective QCL information that maps to each respective resource of the set of SP/P CLI measurement resources, or respective QCL information that maps to each respective resource of the subset of CLI SP/P CLI measurement resources. In some aspects, the first activation is configured to activate a subset of the set of SP/P CLI measurement resources, and where the first activation includes a first list of QCL information and a second list of QCL update information, where each respective QCL information in the first list maps to a respective resource of the subset of SP/P CLI measurement resources, and where each respective QCL update information in the second list maps to a respective resource of a second active subset in the set of SP/P CLI measurement resources. In some aspects, the first activation is a MAC CE, and where the first activation includes one or more resource IDs, where each respective resource ID of the resource IDs is associated with a respective resource of the set of SP/P CLI measurement resources, and where the first activation is configured to activate the respective resource. In some aspects, the first activation includes a list of QCL information, and where each respective QCL information in the list maps to a respective resource of the set of SP/P CLI measurement resources.

At 1505, the network entity may transmit a second activation. For example, the network entity 804 may transmit a second activation (e.g., 811). In some aspects, 1508 may be performed by the CLI component 199. In some aspects, the first activation is a first MAC CE, where the at least one processor is configured to: transmit a second activation, where the CLI measurement information is received based on the second activation, and where the second activation is a second MAC CE different from the first MAC CE.

At 1506, the network entity may receive CLI measurement information based on the set of SP/P CLI measurement resources and the first activation. For example, the network entity 804 may receive CLI measurement information (e.g., 814) based on the set of SP/P CLI measurement resources and the first activation. In some aspects, 1506 may be performed by the CLI component 199.

At 1508, the network entity may transmit a first deactivation associated with the set of SP/P CLI measurement resources. For example, the network entity 804 may transmit a first deactivation (e.g., 818) associated with the set of SP/P CLI measurement resources. In some aspects, 1508 may be performed by the CLI component 199.

At 1510, the network entity may transmit a second deactivation configured to deactivate second CLI measurement information based on the set of SP/P CLI measurement resources. For example, the network entity 804 may transmit a second deactivation (e.g., 820) configured to deactivate second CLI measurement information based on the set of SP/P CLI measurement resources. In some aspects, 1510 may be performed by the CLI component 199.

Figure 16:
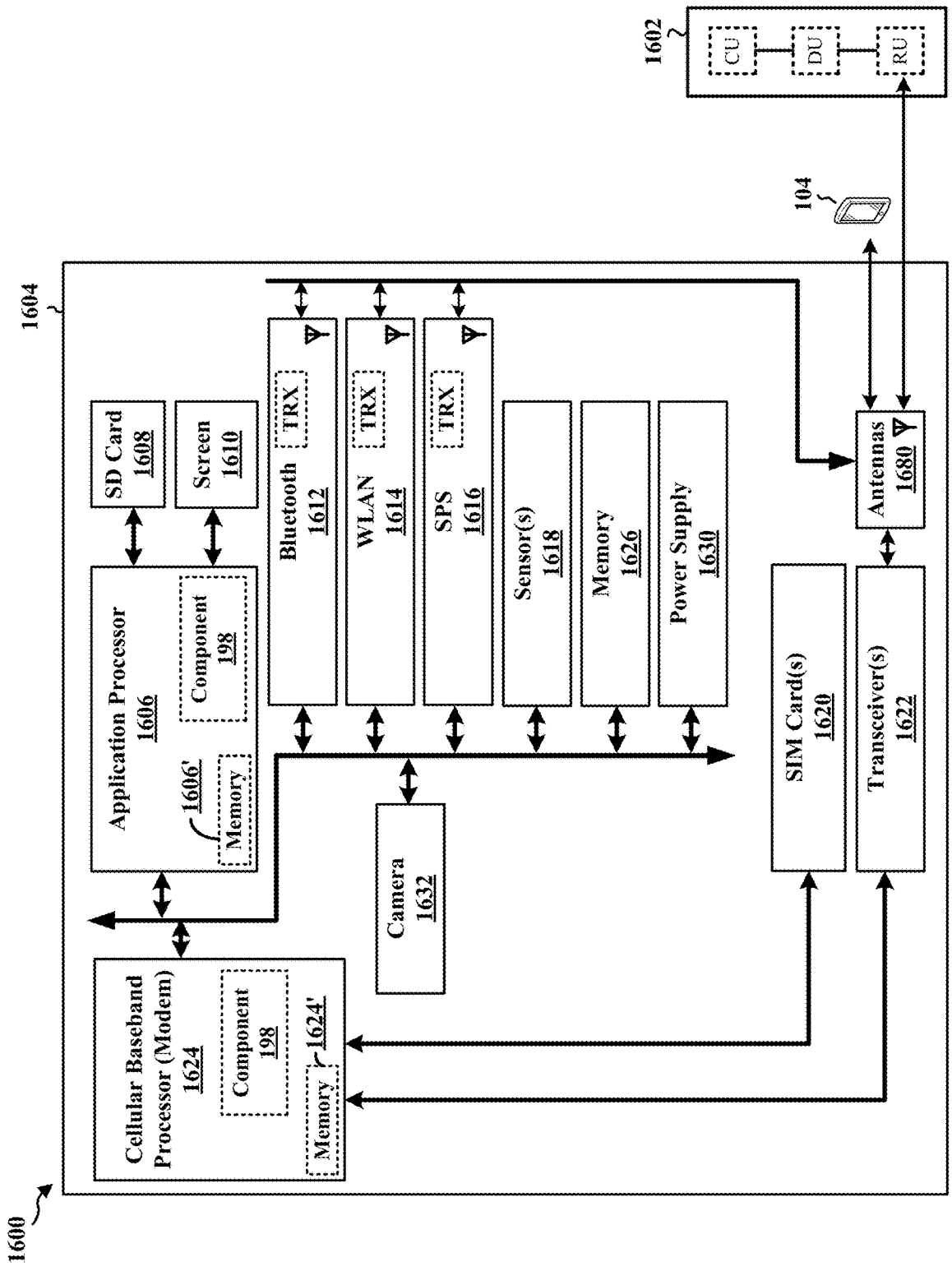
FIG. 16 is a diagram illustrating an example of a hardware implementation for an example apparatus and/or network entity.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include a cellular baseband processor 1624 (also referred to as a modem) coupled to one or more transceivers 1622 (e.g., cellular RF transceiver). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, a satellite system module 1616 (e.g., GNSS module), one or more sensor modules 1618 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the satellite system module 1616 may include an on-chip transceiver (TRX)/receiver (RX). The cellular baseband processor 1624 communicates through the transceiver(s) 1622 via one or more antennas 1680 with the UE 104 and/or with an RU associated with a network entity 1602. The cellular baseband processor 1624 and the application processor 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described herein. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the TX processor 368, the RX processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see 350 of FIG. 3) and include the additional modules of the apparatus 1604.

As discussed herein, the CLI component 198 may be configured to receive, from a second network entity, a configuration of a set of semi-persistent (SP) or periodic (P) (SP/P) cross-link interference (CLI) measurement resources for layer 2 (L2) CLI measurement, where the set of SP/P CLI measurement resources are associated with one or more measurement resource types including at least one of: a zero power sounding reference signal (ZP SRS), a channel state information (CSI) interference measurement (CSI IM) resource, a non-zero power (NZP) CSI reference signal (CSI RS), or a combination of the NZP CSI RS and CSI IM, where the one or more measurement resource types are tied to at least one respective CLI reporting metric or not tied to the respective CLI reporting metric. In some aspects, the CLI component 198 may be further configured to receive, from the second network entity, a first activation associated with the set of SP/P CLI measurement resources. In some aspects, the CLI component 198 may be further configured to generate CLI measurement information based on the set of SP/P CLI measurement resources and the first activation. In some aspects, the CLI component 198 may be further configured to transmit, to the second network entity, the CLI measurement information. The CLI component 198 may be within the cellular baseband processor 1624, the application processor 1606, or both the cellular baseband processor 1624 and the application processor 1606. The CLI component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, includes means for receiving, from a second network entity, a configuration of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. In some aspects, the apparatus 1604 may further include means for receiving, from the second network entity, a first activation associated with the set of SP/P CLI measurement resources. In some aspects, the apparatus 1604 may further include means for generating CLI measurement information based on the set of SP/P CLI measurement resources and the first activation. In some aspects, the apparatus 1604 may further include means for transmitting, to the second network entity, the CLI measurement information. In some aspects, the apparatus 1604 may further include means for receiving a second activation. In some aspects, the apparatus 1604 may further include means for receiving a first deactivation associated with the set of SP/P CLI measurement resources. In some aspects, the apparatus 1604 may further include means for receiving a second deactivation configured to deactivate generation of second CLI measurement information based on the set of SP/P CLI measurement resources. In some aspects, the apparatus 1604 may further include means for applying one of the first timing configuration or the second timing configuration based on one of: a first relaxed timing configuration of the first timing configuration or the second timing configuration, the first timing configuration, the second timing configuration, or a first stricter timing configuration of the first timing configuration or the second timing configuration. In some aspects, the apparatus 1604 may further include means for applying one of the third timing configuration or the fourth timing configuration based on one of: a second relaxed timing configuration of the third timing configuration or the fourth timing configuration, the third timing configuration, the fourth timing configuration, or a second stricter timing configuration of the third timing configuration or the fourth timing configuration. The means may be the CLI component 198 of the apparatus 1604 configured to perform the functions recited by the means. As described herein, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

Figure 17:
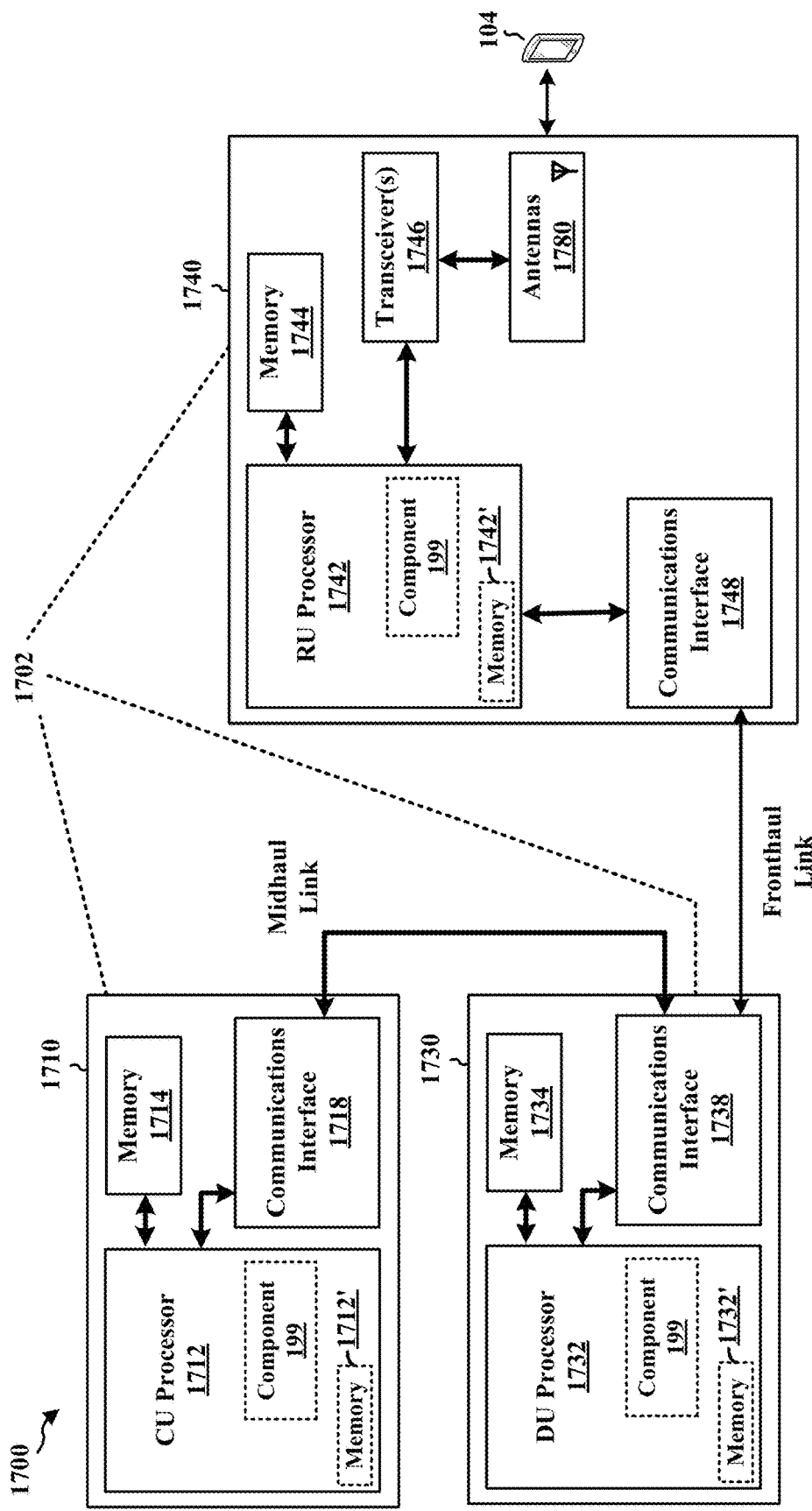
FIG. 17 is a diagram illustrating an example of a hardware implementation for an example network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the CLI component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the CLI component 199 may be configured to transmit, for a second network entity, a configuration of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. In some aspects, the CLI component 199 may be further configured to transmit, for the second network entity, a first activation associated with the set of SP/P CLI measurement resources. In some aspects, the CLI component 199 may be further configured to receive CLI measurement information based on the set of SP/P CLI measurement resources and the first activation. The CLI component 199 may be within one or more processors of one or more of the CU 1710, DU 1730, and the RU 1740. The CLI component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 includes means for transmitting, for a second network entity, a configuration of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric. In some aspects, the network entity 1702 may further include means for transmitting, for the second network entity, a first activation associated with the set of SP/P CLI measurement resources. In some aspects, the network entity 1702 may further include means for receiving CLI measurement information based on the set of SP/P CLI measurement resources and the first activation. In some aspects, the network entity 1702 may further include means for transmitting a second activation, where the CLI measurement information is received based on the second activation. In some aspects, the network entity 1702 may further include means for transmitting a second activation, where the CLI measurement information is received based on the second activation, and where the second activation is a second MAC CE different from the first MAC CE. In some aspects, the network entity 1702 may further include means for transmitting a first deactivation associated with the set of SP/P CLI measurement resources. In some aspects, the network entity 1702 may further include means for transmitting a second deactivation configured to deactivate second CLI measurement information based on the set of SP/P CLI measurement resources. The means may be the CLI component 199 of the network entity 1702 configured to perform the functions recited by the means. As described herein, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a first network entity for wireless communication, including: a memory; and at least one processor coupled to the memory, where the at least one processor is configured to: receive, from a second network entity, a configuration of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric; receive, from the second network entity, a first activation associated with the set of SP/P CLI measurement resources; generate CLI measurement information based on the set of SP/P CLI measurement resources and the first activation; and transmit, to the second network entity, the CLI measurement information.

Aspect 2 is the first network entity of aspect 1, where the one or more measurement resource types are not tied to the respective CLI reporting metric.

Aspect 3 is the first network entity of any of aspects 1-2, where the one or more measurement resource types are tied to the at least one respective CLI reporting metric, where the ZP SRS is tied to a RSRP, a RSSI, or a SINR, where the NZP CSI RS is tied to the RSSI and the RSRP, where the CSI IM is tied to the RSSI or the RSRP, and where the combination is tied to the RSSI, the RSRP, and the SINR.

Aspect 4 is the first network entity of any of aspects 1-3, where the configuration of the set of SP/P CLI measurement resources indicates one or more time and frequency resources, and where the configuration of the set of SP/P CLI measurement resources indicates the one or more time and frequency resources as a resource set.

Aspect 5 is the first network entity of any of aspects 1-4, where the first activation indicates one or more time and frequency resources associated with the set of SP/P CLI measurement resources, and where the configuration of the set of SP/P CLI measurement resources does not indicate the one or more time and frequency resources as a resource set.

Aspect 6 is the first network entity of any of aspects 1-5, where the first activation is a first MAC CE, where the at least one processor is configured to: receive a second activation, where, to transmit the CLI measurement information, the at least one processor is configured to transmit of the CLI measurement information based on the second activation, and where the second activation is a second MAC CE different from the first MAC CE.

Aspect 7 is the first network entity of any of aspects 1-6, where the first activation is a MAC CE, and where the first activation includes an ID of the set of SP/P CLI measurement resources, and where the first activation is configured to activate the set of SP/P CLI measurement resources.

Aspect 8 is the first network entity of any of aspects 1-7, where the first activation includes respective QCL information that maps to each respective resource of the set of SP/P CLI measurement resources.

Aspect 9 is the first network entity of any of aspects 1-8, where the first activation includes a list including the respective QCL information that maps to each respective resource in the set of SP/P CLI measurement resources.

Aspect 10 is the first network entity of any of aspects 1-6, where the first activation is a MAC CE, and where the first activation includes a bitmap associated with the set of SP/P CLI measurement resources and is configured to activate a subset of the set of SP/P CLI measurement resources, where each bit in the bitmap corresponds to one respective resource in the set of SP/P CLI measurement resources.

Aspect 11 is the first network entity of any of aspects 1-6 and 10, where the first activation is configured to activate a subset of the set of SP/P CLI measurement resources, and where the first activation includes: respective QCL information that maps to each respective resource of the set of SP/P CLI measurement resources, or respective QCL information that maps to each respective resource of the subset of CLI SP/P CLI measurement resources.

Aspect 12 is the first network entity of any of aspects 1-6 and 10, where the first activation is configured to activate a subset of the set of SP/P CLI measurement resources, and where the first activation includes a first list of QCL information and a second list of QCL update information, where each respective QCL information in the first list maps to a respective resource of the subset of SP/P CLI measurement resources, and where each respective QCL update information in the second list maps to a respective resource of a second active subset in the set of SP/P CLI measurement resources.

Aspect 13 is the first network entity of any of aspects 1-6, where the first activation is a MAC CE, and where the first activation includes one or more resource identifiers (IDs), where each respective resource ID of the resource IDs is associated with a respective resource of the set of SP/P CLI measurement resources, and where the first activation is configured to activate the respective resource.

Aspect 14 is the first network entity of any of aspects 1-6 and 13, where the first activation includes a list of QCL information, and where each respective QCL information in the list maps to the respective resource of the set of SP/P CLI measurement resources.

Aspect 15 is the first network entity of any of aspects 1-14, where the at least one processor is configured to: receive a second activation, where, to transmit the CLI measurement information, the at least one processor is configured to transmit of the CLI measurement information based on the second activation; receive a first deactivation associated with the set of SP/P CLI measurement resources; and receive a second deactivation configured to deactivate generation of second CLI measurement information based on the set of SP/P CLI measurement resources.

Aspect 16 is the first network entity of any of aspects 1-15, where a first timing configuration associated with the first deactivation is equivalent to a second timing configuration associated with the first activation.

Aspect 17 is the first network entity of any of aspects 1-15, where a first timing configuration associated with the first deactivation is different from a second timing configuration associated with the first activation.

Aspect 18 is the first network entity of any of aspects 1-17, where a first timing configuration is associated with the first deactivation and a second timing configuration is associated with the first activation, and where the second timing configuration represents an application of the first activation after one of: a first quantity of slots independent of a capability associated with the first network entity, or a second quantity of slots based on the capability.

Aspect 19 is the first network entity of any of aspects 1-18, where the second quantity equals one of: $n+X \cdot N_{slot}^{subframe,\mu}$ or $n+Z \cdot N_{slot}^{subframe,\mu}+Y$, where X is a first positive integer based on the capability, where Y is a second positive integer based on the capability, where Z is a third positive integer independent of the capability, where n is associated with a slot n associated with an acknowledgment (ACK) associated with the first activation, and where $N_{slot}^{subframe,\mu}$ represents a number of slot slots per subframe for a subcarrier spacing represented by μ.

Aspect 20 is the first network entity of any of aspects 1-20, where a first timing configuration is associated with the first deactivation and a second timing configuration is associated with the first activation, and where the first timing configuration represents an application of the first deactivation after one of: a first quantity of slots independent of a capability associated with the first network entity, or a second quantity of slots based on the capability.

Aspect 21 is the first network entity of any of aspects 1-20, where the second quantity equals one of: $n+X \cdot N_{slot}^{subframe,\mu}$ or $n+Z \cdot N_{slot}^{subframe,\mu}+Y$, where X is a first positive integer based on the capability, where Y is a second positive integer based on the capability, where Z is a third positive integer independent of the capability, where n is associated with a slot n associated with an acknowledgment (ACK) associated with the first deactivation, and where $N\ N_{slot}^{subframe,\mu}$ represent a number of slots per subframe for a subcarrier spacing represented by μ.

Aspect 22 is the first network entity of any of aspects 1-21, where a first timing configuration associated with the second deactivation is equivalent to a second timing configuration associated with the second activation.

Aspect 23 is the first network entity of any of aspects 1-21, where a first timing configuration associated with the second deactivation is different from a second timing configuration associated with the second activation.

Aspect 24 is the first network entity of any of aspects 1-23, where a first timing configuration is associated with the second deactivation and a second timing configuration is associated with the second activation, and where the second timing configuration represents an application of the second activation after one of: a first quantity of slots independent of a capability associated with the first network entity, or a second quantity of slots based on the capability.

Aspect 25 is the first network entity of any of aspects 1-24, where the second quantity equals one of: $n+X \cdot N_{slot}^{subframe,\mu}$ or $n+Z \cdot N_{slot}^{subframe,\mu}+Y$, where X is a first positive integer based on the capability, where Y is a second positive integer based on the capability, where Z is a third positive integer independent of the capability, where n is associated with a slot n associated with an acknowledgment (ACK) associated with the second activation, and where $N_{slot}^{subframe,\mu}$ represent a number of slots per subframe for a subcarrier spacing represented by μ.

Aspect 26 is the first network entity of any of aspects 1-25, where a first timing configuration is associated with the second deactivation and a second timing configuration is associated with the second activation, and where the first timing configuration represents an application of the second deactivation after one of: a first quantity of slots independent of a capability associated with the first network entity, or a second quantity of slots based on the capability.

Aspect 27 is the first network entity of any of aspects 1-24, where the second quantity equals one of: $n+X \cdot N_{slot}^{subframe,\mu}$ or $n+Z \cdot N_{slot}^{subframe,\mu}+Y$, where X is a first positive integer based on the capability, where Y is a second positive integer based on the capability, where Z is a third positive integer independent of the capability, where n is associated with a slot n associated with an acknowledgment (ACK) associated with the second deactivation, and where $N_{slot}^{subframe,\mu}$ represent a number of slots per subframe for a subcarrier spacing represented by μ.

Aspect 28 is the first network entity of any of aspects 1-27, where a timing configuration is associated with the second activation, and where at least one resource earlier in time than an application of the second activation based on the timing configuration is included or excluded in the set of measurements.

Aspect 29 is the first network entity of any of aspects 1-28, where a timing configuration is associated with the second deactivation, and where at least one resource earlier in time than an application of the second deactivation based on the timing configuration is included or excluded in the set of measurements.

Aspect 30 is the first network entity of any of aspects 1-29, where a joint activation in a first MAC CE includes the first activation and the second activation, and where a joint deactivation in a second MAC CE includes the first deactivation and the second deactivation, where a first timing configuration is associated with the first activation, a second timing configuration is associated with the second activation, a third timing configuration is associated with the first deactivation, and a fourth timing configuration is associated with the second deactivation.

Aspect 31 is the first network entity of any of aspects 1-30, where the first timing configuration is equivalent to the second timing configuration, and where the third timing configuration is equivalent to the fourth timing configuration.

Aspect 32 is the first network entity of any of aspects 1-31, where the at least one processor is configured to: apply one of the first timing configuration or the second timing configuration based on one of: a first relaxed timing configuration of the first timing configuration or the second timing configuration, the first timing configuration, the second timing configuration, or a first stricter timing configuration of the first timing configuration or the second timing configuration; and apply one of the third timing configuration or the fourth timing configuration based on one of: a second relaxed timing configuration of the third timing configuration or the fourth timing configuration, the third timing configuration, the fourth timing configuration, or a second stricter timing configuration of the third timing configuration or the fourth timing configuration.

Aspect 33 is the first network entity of any of aspects 1-32, where the configuration is active when a downlink BWP associated with the configuration is active.

Aspect 34 is the first network entity of any of aspects 1-33, where the configuration is inactive when a carrier associated with the configuration is deactivated.

Aspect 35 is the first network entity of any of aspects 1-34, where the configuration is inactive when a BWP associated with the configuration is deactivated.

Aspect 36 is a first network entity for wireless communication, including: a memory; and at least one processor coupled to the memory, where the at least one processor is configured to: transmit, for a second network entity, a configuration of a set of SP/P CLI measurement resources for L2 CLI measurement, where the set of SP/P CLI measurement resources are associated with one or more measurement resource types including at least one of: a ZP SRS, a CSI IM resource, a NZP CSI RS, or a combination of the NZP CSI RS and CSI IM, where the one or more measurement resource types are tied to at least one respective CLI reporting metric or not tied to the respective CLI reporting metric; transmit, for the second network entity, a first activation associated with the set of SP/P CLI measurement resources; and receive CLI measurement information based on the set of SP/P CLI measurement resources and the first activation.

Aspect 37 is the first network entity of aspect 36, where the one or more measurement resource types are not tied to the respective CLI reporting metric.

Aspect 38 is the first network entity of any of aspects 36-37, where the one or more measurement resource types are tied to the at least one respective CLI reporting metric, where the ZP SRS is tied to a RSRP, a RSSI, or a SINR, where the NZP CSI RS is tied to the RSSI and the RSRP, where the CSI IM is tied to the RSSI or the RSRP, and where the combination is tied to the RSSI, the RSRP, and the SINR.

Aspect 39 is the first network entity of any of aspects 36-38, where the configuration of the set of SP/P CLI measurement resources indicates one or more time and frequency resources, and where the configuration of the set of SP/P CLI measurement resources indicates the one or more time and frequency resources as a resource set.

Aspect 40 is the first network entity of any of aspects 36-39, where the first activation indicates one or more time and frequency resources associated with the set of SP/P CLI measurement resources, and where the configuration of the set of SP/P CLI measurement resources does not indicate the one or more time and frequency resources as a resource set.

Aspect 41 is the first network entity of any of aspects 36-40, where the first activation is a first MAC CE, where the at least one processor is configured to: transmit a second activation, where the CLI measurement information is received based on the second activation, and where the second activation is a second MAC CE different from the first MAC CE.

Aspect 42 is the first network entity of any of aspects 36-41, where the first activation is a MAC CE, and where the first activation includes an ID of the set of SP/P CLI measurement resources, and where the first activation is configured to activate the set of SP/P CLI measurement resources.

Aspect 43 is the first network entity of any of aspects 36-42, where the first activation includes respective QCL information that maps to each respective resource of the set of SP/P CLI measurement resources.

Aspect 44 is the first network entity of any of aspects 36-43, where the first activation includes a list including the respective QCL information that maps to each respective resource in the set of SP/P CLI measurement resources.

Aspect 45 is the first network entity of any of aspects 36-41, where the first activation is a MAC CE, and where the first activation includes a bitmap associated with the set of SP/P CLI measurement resources and is configured to activate a subset of the set of SP/P CLI measurement resources, where each bit in the bitmap corresponds to one respective resource in the set of SP/P CLI measurement resources.

Aspect 46 is the first network entity of any of aspects 36-41 and 45, where the first activation is configured to activate a subset of the set of SP/P CLI measurement resources, and where the first activation includes: respective QCL information that maps to each respective resource of the set of SP/P CLI measurement resources, or respective QCL information that maps to each respective resource of the subset of CLI SP/P CLI measurement resources.

Aspect 47 is the first network entity of any of aspects 36-41 and 45, where the first activation is configured to activate a subset of the set of SP/P CLI measurement resources, and where the first activation includes a first list of QCL information and a second list of QCL update information, where each respective QCL information in the first list maps to a respective resource of the subset of SP/P CLI measurement resources, and where each respective QCL update information in the second list maps to a respective resource of a second active subset in the set of SP/P CLI measurement resources.

Aspect 48 is the first network entity of any of aspects 36-41, where the first activation is a MAC CE, and where the first activation includes one or more resource identifiers (IDs), where each respective resource ID of the resource IDs is associated with a respective resource of the set of SP/P CLI measurement resources, and where the first activation is configured to activate the respective resource.

Aspect 49 is the first network entity of any of aspects 36-41 and 48, where the first activation includes a list of QCL information, and where each respective QCL information in the list maps to the respective resource of the set of SP/P CLI measurement resources.

Aspect 50 is the first network entity of any of aspects 36-49, where the at least one processor is configured to: transmit a second activation, where the CLI measurement information is received based on the second activation; transmit a first deactivation associated with the set of SP/P CLI measurement resources; and transmit a second deactivation configured to deactivate second CLI measurement information based on the set of SP/P CLI measurement resources.

Aspect 51 is a method of wireless communication for implementing any of aspects 1 to 35.

Aspect 52 is an apparatus for wireless communication including means for implementing any of aspects 1 to 35.

Aspect 53 is a computer-readable medium storing computer executable code, where the code when executed by a processor causes the processor to implement any of aspects 1 to 35.

Aspect 54 is a method of wireless communication for implementing any of aspects 36 to 50.

Aspect 55 is an apparatus for wireless communication including means for implementing any of aspects 36 to 50.

Aspect 56 is a computer-readable medium storing computer executable code, where the code when executed by a processor causes the processor to implement any of aspects 36 to 50.

What is claimed is:

1. A first network entity for wireless communication, comprising:
a memory; and
at least one processor coupled to the memory, wherein the at least one processor is configured to:
receive, from a second network entity, a configuration of a set of semi-persistent (SP) or periodic (P) (SP/P) cross-link interference (CLI) measurement resources for layer 2 (L2) CLI measurement, wherein the set of SP/P CLI measurement resources are associated with one or more measurement resource types including at least one of: a zero power sounding reference signal (ZP SRS), a channel state information (CSI) interference measurement (CSI IM) resource, a non-zero power (NZP) CSI reference signal (CSI RS), or a combination of the NZP CSI RS and CSI IM;
receive, from the second network entity, a first medium access control (MAC) control element (MAC CE) associated with the set of SP/P CLI measurement resources;
generate CLI measurement information based on the set of SP/P CLI measurement resources and the first MAC CE;
receive a second MAC CE different from the first MAC CE; and
transmit, based on the second MAC CE, the CLI measurement information to the second network entity.

2. The first network entity of claim 1, wherein the one or more measurement resource types are not tied to the respective CLI reporting metric.

3. The first network entity of claim 1, wherein the one or more measurement resource types are tied to the at least one respective CLI reporting metric, wherein the ZP SRS is tied to a reference signal received power (RSRP), a received signal strength indicator (RSSI), or a signal to interference and noise ratio (SINR), wherein the NZP CSI RS is tied to the RSSI and the RSRP, wherein the CSI IM is tied to the RSSI or the RSRP, and wherein the combination is tied to the RSSI, the RSRP, and the SINR.

4. The first network entity of claim 1, wherein the configuration of the set of SP/P CLI measurement resources indicates one or more time and frequency resources, and wherein the configuration of the set of SP/P CLI measurement resources indicates the one or more time and frequency resources as a resource set.

5. The first network entity of claim 1, wherein the first MAC CE comprises one or more resource identifiers (IDs), wherein each respective resource ID of the resource IDs is associated with a respective resource of the set of SP/P CLI measurement resources, and wherein the first MAC CE is configured to activate the respective resource.

6. The first network entity of claim 5, wherein the MAC CE comprises a list of quasi-co-location (QCL) information, and wherein each respective QCL information in the list maps to the respective resource of the set of SP/P CLI measurement resources.

7. The first network entity of claim 1, wherein the configuration is active when a downlink bandwidth part (BWP) associated with the configuration is active.

8. The first network entity of claim 1, wherein the configuration is inactive when a carrier associated with the configuration is deactivated.

9. The first network entity of claim 1, wherein the configuration is inactive when a bandwidth part (BWP) associated with the configuration is deactivated.

10. A first network entity for wireless communication, comprising:
a memory; and
at least one processor coupled to the memory, wherein the at least one processor is configured to:
receive, from a second network entity, a configuration of a set of semi-persistent (SP) or periodic (P) (SP/P) cross-link interference (CLI) measurement resources for layer 2 (L2) CLI measurement, wherein the set of SP/P CLI measurement resources are associated with one or more measurement resource types including at least one of: a zero power sounding reference signal (ZP SRS), a channel state information (CSI) interference measurement (CSI IM) resource, a non-zero power (NZP) CSI reference signal (CSI RS), or a combination of the NZP CSI RS and CSI IM;
receive, from the second network entity, a first activation associated with the set of SP/P CLI measurement resources, wherein the first activation indicates one or more time and frequency resources associated with the set of SP/P CLI measurement resources, and wherein the configuration of the set of SP/P CLI measurement resources does not indicate the one or more time and frequency resources as a resource set;
generate CLI measurement information based on the set of SP/P CLI measurement resources and the first activation; and
transmit, to the second network entity, the CLI measurement information.

11. A first network entity for wireless communication, comprising:
a memory; and
at least one processor coupled to the memory, wherein the at least one processor is configured to:
receive, from a second network entity, a configuration of a set of semi-persistent (SP) or periodic (P) (SP/P) cross-link interference (CLI) measurement resources for layer 2 (L2) CLI measurement, wherein the set of SP/P CLI measurement resources are associated with one or more measurement resource types including at least one of: a zero power sounding reference signal (ZP SRS), a channel state information (CSI) interference measurement (CSI IM) resource, a non-zero power (NZP) CSI reference signal (CSI RS), or a combination of the NZP CSI RS and CSI IM;
receive, from the second network entity, is a medium access control (MAC) control element (MAC CE) associated with the set of SP/P CLI measurement resources, wherein the MAC CE comprises a bitmap associated with the set of SP/P CLI measurement resources and is configured to activate a subset of the set of SP/P CLI measurement resources, and wherein each bit in the bitmap corresponds to one respective resource in the set of SP/P CLI measurement resources;
generate CLI measurement information based on the set of SP/P CLI measurement resources and the MAC CE; and
transmit, to the second network entity, the CLI measurement information.

12. A first network entity for wireless communication, comprising:
a memory; and
at least one processor coupled to the memory, wherein the at least one processor is configured to:
receive, from a second network entity, a configuration of a set of semi-persistent (SP) or periodic (P) (SP/P) cross-link interference (CLI) measurement resources for layer 2 (L2) CLI measurement, wherein the set of SP/P CLI measurement resources are associated with one or more measurement resource types including at least one of: a zero power sounding reference signal (ZP SRS), a channel state information (CSI) interference measurement (CSI IM) resource, a non-zero power (NZP) CSI reference signal (CSI RS), or a combination of the NZP CSI RS and CSI IM;

receive, from the second network entity, a first activation associated with the set of SP/P CLI measurement resources;
generate CLI measurement information based on the set of SP/P CLI measurement resources and the first activation; and
transmit, to the second network entity, the CLI measurement information, is configured to activate a subset of the set of SP/P CLI measurement resources, and wherein the first activation comprises:
respective quasi-co-location (QCL) information that maps to each respective resource of the set of SP/P CLI measurement resources, or
respective QCL information that maps to each respective resource of the subset of CLI SP/P CLI measurement resources.

13. A first network entity for wireless communication, comprising:
a memory; and
at least one processor coupled to the memory, wherein the at least one processor is configured to:
receive, from a second network entity, a configuration of a set of semi-persistent (SP) or periodic (P) (SP/P) cross-link interference (CLI) measurement resources for layer 2 (L2) CLI measurement, wherein the set of SP/P CLI measurement resources are associated with one or more measurement resource types including at least one of: a zero power sounding reference signal (ZP SRS), a channel state information (CSI) interference measurement (CSI IM) resource, a non-zero power (NZP) CSI reference signal (CSI RS), or a combination of the NZP CSI RS and CSI IM;
receive, from the second network entity, a first activation associated with the set of SP/P CLI measurement resources;
generate CLI measurement information based on the set of SP/P CLI measurement resources and the first activation; and
transmit, to the second network entity, the CLI measurement information, is configured to activate a subset of the set of SP/P CLI measurement resources, wherein the first activation comprises a first list of quasi-co-location (QCL) information and a second list of QCL update information, wherein each respective QCL information in the first list maps to a respective resource of the subset of SP/P CLI measurement resources, and wherein each respective QCL update information in the second list maps to a respective resource of a second active subset in the set of SP/P CLI measurement resources.

14. A first network entity for wireless communication, comprising:
a memory; and
at least one processor coupled to the memory, wherein the at least one processor is configured to:
receive, from a second network entity, a configuration of a set of semi-persistent (SP) or periodic (P) (SP/P) cross-link interference (CLI) measurement resources for layer 2 (L2) CLI measurement, wherein the set of SP/P CLI measurement resources are associated with one or more measurement resource types including at least one of: a zero power sounding reference signal (ZP SRS), a channel state information (CSI) interference measurement (CSI IM) resource, a non-zero power (NZP) CSI reference signal (CSI RS), or a combination of the NZP CSI RS and CSI IM;
receive, from the second network entity, a first activation associated with the set of SP/P CLI measurement resources;
generate CLI measurement information based on the set of SP/P CLI measurement resources and the first activation;
receive a second activation;
transmit, based on the second activation, the CLI measurement information to the second network entity;
receive a first deactivation associated with the set of SP/P CLI measurement resources; and
receive a second deactivation configured to deactivate generation of second CLI measurement information based on the set of SP/P CLI measurement resources.

15. The first network entity of claim 14, wherein a first timing configuration associated with the first deactivation is equivalent to a second timing configuration associated with the first activation.

16. The first network entity of claim 14, wherein a first timing configuration associated with the first deactivation is different from a second timing configuration associated with the first activation.

17. The first network entity of claim 14, wherein a first timing configuration is associated with the first deactivation and a second timing configuration is associated with the first activation, and wherein the second timing configuration represents an application of the first activation after one of:
a first quantity of slots independent of a capability associated with the first network entity, or
a second quantity of slots based on the capability.

18. The first network entity of claim 17, wherein the second quantity equals one of: $n+X \cdot N_{slot}^{subframe,\mu}$ or $n+Z \cdot N_{slot}^{subframe,\mu}+Y$, wherein X is a first positive integer based on the slot capability, wherein Y is a second positive integer based on the capability, wherein Z is a third positive integer independent of the capability, wherein n is associated with a slot n associated with an acknowledgment (ACK) associated with the first activation, and wherein $N_{slot}^{subframe,\mu}$ slot represents a number of slots per subframe for a subcarrier spacing represented by $\mu$.

19. The first network entity of claim 14, wherein a first timing configuration is associated with the first deactivation and a second timing configuration is associated with the first activation, and wherein the first timing configuration represents an application of the first deactivation after one of:
a first quantity of slots independent of a capability associated with the first network entity, or a second quantity of slots based on the capability.

20. The first network entity of claim 19, wherein the second quantity equals one of: $n+X \cdot N_{slot}^{subframe,\mu}$ or $n+Z \cdot N_{slot}^{subframe,\mu}+Y$, wherein X is a first positive integer based on the capability, wherein Y is a second positive integer based on the capability, wherein Z is a third positive integer independent of the capability, wherein n is associated with a slot n associated with an acknowledgment (ACK) associated with the first deactivation, and wherein $N_{slot}^{subframe,\mu}$ represent a number of slots per subframe for a subcarrier spacing represented by $\mu$.

21. The first network entity of claim 14, wherein a first timing configuration associated with the second deactivation is equivalent to a second timing configuration associated with the second activation.

22. The first network entity of claim 14, wherein a first timing configuration associated with the second deactivation is different from a second timing configuration associated with the second activation.

23. The first network entity of claim 14, wherein a first timing configuration is associated with the second deactivation and a second timing configuration is associated with the second activation, and wherein the second timing configuration represents an application of the second activation after one of:
- a first quantity of slots independent of a capability associated with the first network entity, or
- a second quantity of slots based on the capability.

24. The first network entity of claim 23, wherein the second quantity equals one of: $n+X \cdot N_{slot}^{subframe,\mu}$ or $n+Z \cdot N_{slot}^{subframe,\mu}+Y$, wherein X is a first positive integer based on the capability, wherein Y is a second positive integer based on the capability, wherein Z is a third positive integer independent of the capability, wherein n is associated with a slot n associated with an acknowledgment (ACK) associated with the second activation, and wherein $N_{slot}^{subframe,\mu}$ represent a number of slots per subframe for a subcarrier spacing represented by $\mu$.

25. The first network entity of claim 14, wherein a first timing configuration is associated with the second deactivation and a second timing configuration is associated with the second activation, and wherein the first timing configuration represents an application of the second deactivation after one of:
- a first quantity of slots independent of a capability associated with the first network entity, or
- a second quantity of slots based on the capability.

26. The first network entity of claim 23, wherein the second quantity equals one of: $n+X \cdot N_{slot}^{subframe,\mu}$ or $n+Z \cdot N_{slot}^{subframe,\mu}+Y$, wherein X is a first positive integer based on the capability, wherein Y is a second positive integer based on the capability, wherein Z is a third positive integer independent of the capability, wherein n is associated with a slot n associated with an acknowledgment (ACK) associated with the second deactivation, and wherein $N_{slot}^{subframe,\mu}$ represent a number of slots per subframe for a subcarrier spacing represented by $\mu$.

27. The first network entity of claim 14, wherein a timing configuration is associated with the second activation, and wherein at least one resource earlier in time than an application of the second activation based on the timing configuration is included or excluded in the set of measurements.

28. The first network entity of claim 14, wherein a timing configuration is associated with the second deactivation, and wherein at least one resource earlier in time than an application of the second deactivation based on the timing configuration is included or excluded in the set of measurements.

29. The first network entity of claim 14, wherein a joint activation in a first medium access control (MAC) control element (MAC CE) comprises the first activation and the second activation, and wherein a joint deactivation in a second MAC CE comprises the first deactivation and the second deactivation, wherein a first timing configuration is associated with the first activation, a second timing configuration is associated with the second activation, a third timing configuration is associated with the first deactivation, and a fourth timing configuration is associated with the second deactivation.

30. The first network entity of claim 29, wherein the first timing configuration is equivalent to the second timing configuration, and wherein the third timing configuration is equivalent to the fourth timing configuration.

31. The first network entity of claim 29, wherein the at least one processor is configured to:
- apply one of the first timing configuration or the second timing configuration based on one of: a first relaxed timing configuration of the first timing configuration or the second timing configuration, the first timing configuration, the second timing configuration, or a first stricter timing configuration of the first timing configuration or the second timing configuration; and
- apply one of the third timing configuration or the fourth timing configuration based on one of: a second relaxed timing configuration of the third timing configuration or the fourth timing configuration, the third timing configuration, the fourth timing configuration, or a second stricter timing configuration of the third timing configuration or the fourth timing configuration.

* * * * *